United States Patent
Noh et al.

(10) Patent No.: US 11,595,510 B2
(45) Date of Patent: *Feb. 28, 2023

(54) MOBILE TERMINAL AND CONTROL METHOD THEREFOR

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,676

(22) Filed: May 19, 2021

(65) Prior Publication Data

US 2021/0392224 A1    Dec. 16, 2021

Related U.S. Application Data

(63) Continuation of application No. 16/992,060, filed on Aug. 12, 2020, now Pat. No. 11,057,514.

(30) Foreign Application Priority Data

Jun. 11, 2020   (WO) ................ PCT/KR2020/007562

(51) Int. Cl.
*G06F 3/041*   (2006.01)
*G06F 3/01*    (2006.01)
(Continued)

(52) U.S. Cl.
CPC ........ *H04M 1/72463* (2021.01); *G06F 3/048* (2013.01); *G06F 3/0488* (2013.01); *G06F 3/01* (2013.01)

(58) Field of Classification Search
None
See application file for complete search history.

(56) References Cited

U.S. PATENT DOCUMENTS 8,436,806 B2    5/2013  Almalki et al.
8,593,418 B2   11/2013  Blow et al.
(Continued)

FOREIGN PATENT DOCUMENTS

EP       3531230        8/2019
KR    1020150126201    11/2015
(Continued)

OTHER PUBLICATIONS

PCT International Application No. PCT/KR2020/007562, Search Report dated Feb. 26, 2021, 10 pages.

(Continued)

*Primary Examiner* — Jordany Nunez
(74) *Attorney, Agent, or Firm* — Lee, Hong, Degerman, Kang & Waimey PC

(57) ABSTRACT

A mobile terminal and a control method therefor are disclosed. The mobile terminal includes a body, an input unit configured to receive a user input, a display coupled to the body to vary a display region viewed from a front of the body according to switching between an enlarged display mode and a reduced display mode, and a controller. The controller controls the display to be extended by a first region upon receiving a first signal, and controls the display to activate a touch function of the first region after activating an output function of the first region, based on extension of the display by the first region.

10 Claims, 21 Drawing Sheets

(51) Int. Cl.
*G06F 3/14* (2006.01)
*H04M 1/72463* (2021.01)
*G06F 3/048* (2013.01)
*G06F 3/0488* (2022.01)

(56) References Cited

U.S. PATENT DOCUMENTS

| | | | |
|---|---|---|---|
| 8,806,385 B1* | 8/2014 | Rinckes | G06F 3/04847 |
| | | | 345/173 |
| 8,842,090 B1* | 9/2014 | Cho | G06F 3/04886 |
| | | | 345/173 |
| 9,392,095 B2* | 7/2016 | Park | G06F 3/0485 |
| 9,411,421 B2 | 8/2016 | Tamura | |
| 9,448,660 B2 | 9/2016 | Seo et al. | |
| 9,652,136 B2 | 5/2017 | Tarvainen et al. | |
| 9,747,014 B2 | 8/2017 | Tarvainen et al. | |
| 9,760,267 B2 | 9/2017 | Tarvainen et al. | |
| 9,830,075 B2* | 11/2017 | Kim | H04M 1/0214 |
| 9,864,410 B2* | 1/2018 | La | G06F 3/017 |
| 9,864,438 B2 | 1/2018 | Seo et al. | |
| 9,928,570 B2 | 3/2018 | Reed et al. | |
| 9,933,819 B2* | 4/2018 | Kim | G06F 3/04886 |
| 10,019,425 B2 | 7/2018 | Hui et al. | |
| 10,114,476 B2 | 10/2018 | Seo et al. | |
| 10,242,344 B1 | 3/2019 | Libin | |
| 10,275,045 B2 | 4/2019 | Seo et al. | |
| 10,466,521 B2 | 11/2019 | Tamura | |
| 10,489,050 B2 | 11/2019 | Barakat | |
| 10,503,274 B2* | 12/2019 | Seo | G06F 3/0487 |
| 10,627,931 B2* | 4/2020 | Chung | H04M 1/725 |
| 10,635,136 B2* | 4/2020 | La | G06F 1/1652 |
| 10,796,406 B2 | 10/2020 | Reed et al. | |
| 11,042,192 B2* | 6/2021 | Choi | G06F 1/1641 |
| 11,144,095 B2* | 10/2021 | La | H04M 1/0243 |
| 2010/0033435 A1 | 2/2010 | Huitema | |
| 2010/0164837 A1* | 7/2010 | Kao | G06F 1/1616 |
| | | | 345/1.3 |
| 2010/0188354 A1 | 7/2010 | Tamura | |
| 2011/0080350 A1 | 4/2011 | Almalki et al. | |
| 2012/0032979 A1 | 2/2012 | Blow et al. | |
| 2012/0212433 A1 | 8/2012 | Lee et al. | |
| 2013/0120239 A1* | 5/2013 | Suzuki | G06F 1/1643 |
| | | | 345/156 |
| 2013/0120302 A1* | 5/2013 | Kang | G06F 3/0483 |
| | | | 345/173 |
| 2013/0201208 A1* | 8/2013 | Cho | G06F 3/0488 |
| | | | 345/619 |
| 2013/0234951 A1* | 9/2013 | Kim | G06F 3/0481 |
| | | | 345/173 |
| 2014/0028596 A1* | 1/2014 | Seo | G06F 3/0481 |
| | | | 345/173 |
| 2014/0223344 A1 | 8/2014 | Tarvainen et al. | |
| 2014/0223375 A1 | 8/2014 | Tarvainen et al. | |
| 2014/0223376 A1 | 8/2014 | Tarvainen et al. | |
| 2014/0247229 A1* | 9/2014 | Cho | G06F 1/1652 |
| | | | 345/173 |
| 2014/0285450 A1* | 9/2014 | Cho | G06F 3/0412 |
| | | | 345/173 |
| 2015/0277756 A1* | 10/2015 | Kim | H04M 1/72403 |
| | | | 455/566 |
| 2015/0278164 A1 | 10/2015 | Kim et al. | |
| 2016/0026219 A1* | 1/2016 | Kim | G06F 1/1641 |
| | | | 345/173 |
| 2016/0026381 A1* | 1/2016 | Kim | G06F 3/0482 |
| | | | 715/761 |
| 2016/0070305 A1* | 3/2016 | Kim | G06F 3/0487 |
| | | | 345/173 |
| 2016/0098818 A1 | 4/2016 | Reed et al. | |
| 2016/0105542 A1* | 4/2016 | Lee | G06F 1/1652 |
| | | | 455/566 |
| 2016/0179236 A1* | 6/2016 | Shin | G06F 3/0487 |
| | | | 345/173 |
| 2016/0187994 A1* | 6/2016 | La | G06F 1/1677 |
| | | | 345/619 |
| 2016/0292139 A1 | 10/2016 | Hui et al. | |
| 2016/0342000 A1 | 11/2016 | Tamura | |
| 2016/0370877 A1* | 12/2016 | Seo | G06F 3/017 |
| 2017/0154609 A1* | 6/2017 | Yoon | G06F 3/0488 |
| 2018/0039410 A1* | 2/2018 | Kim | G06F 1/1677 |
| 2018/0120954 A1* | 5/2018 | Seo | G06F 3/0481 |
| 2018/0129268 A1* | 5/2018 | Lee | G06F 3/04886 |
| 2018/0286014 A1 | 10/2018 | Reed et al. | |
| 2018/0364827 A1* | 12/2018 | Chung | G06F 1/1686 |
| 2019/0033984 A1 | 1/2019 | Seo et al. | |
| 2019/0179425 A1 | 6/2019 | Seo et al. | |
| 2019/0196687 A1 | 6/2019 | Barakat | |
| 2020/0117285 A1* | 4/2020 | Seo | G06F 3/0481 |

FOREIGN PATENT DOCUMENTS

| | | |
|---|---|---|
| KR | 1020170038308 | 4/2017 |
| KR | 1020170083404 | 7/2017 |
| KR | 1020190101184 | 8/2019 |

OTHER PUBLICATIONS

European Patent Office Application Serial No. 20208616.1, Search Report dated Apr. 28, 2021, 9 pages.

* cited by examiner

FIG. 6
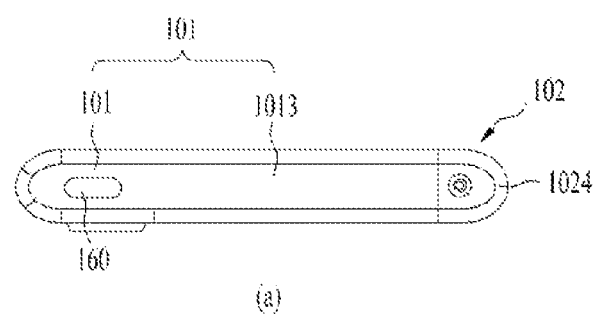
(a)
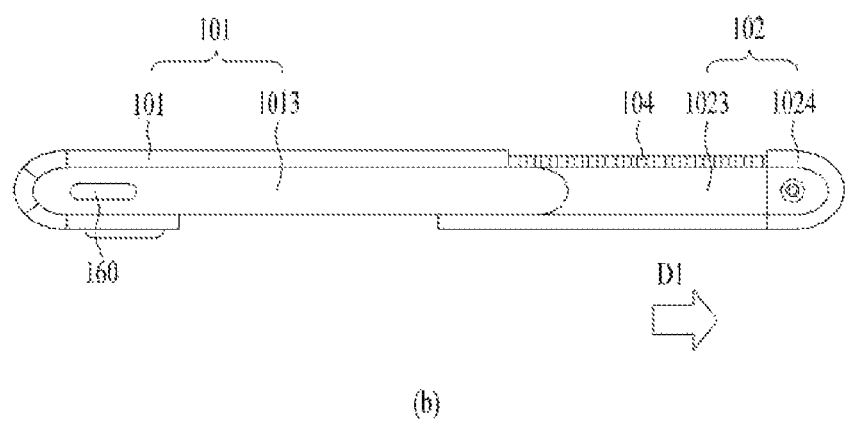
(b)

FIG. 7
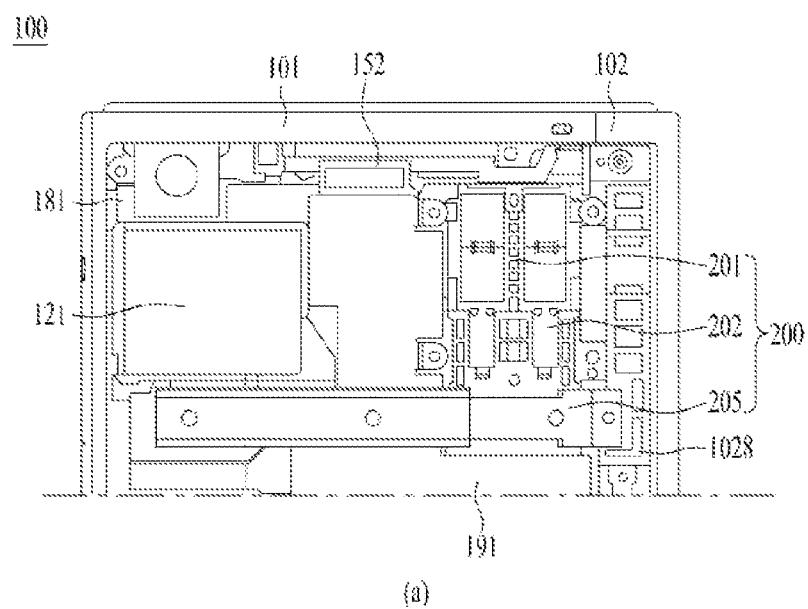
(a)
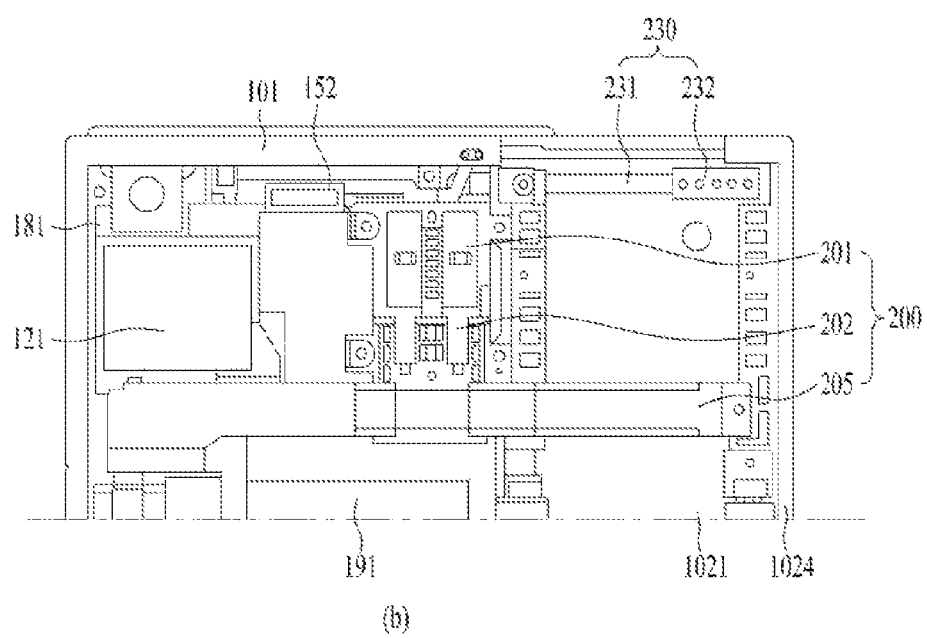
(b)

FIG. 8
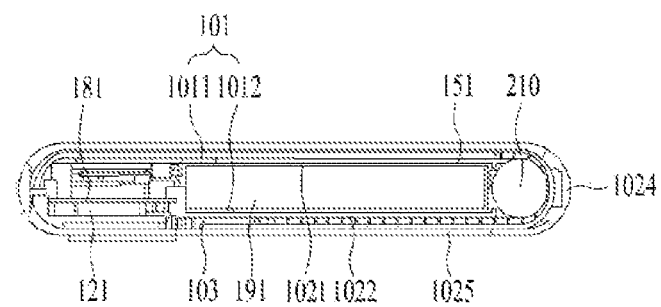
(a)
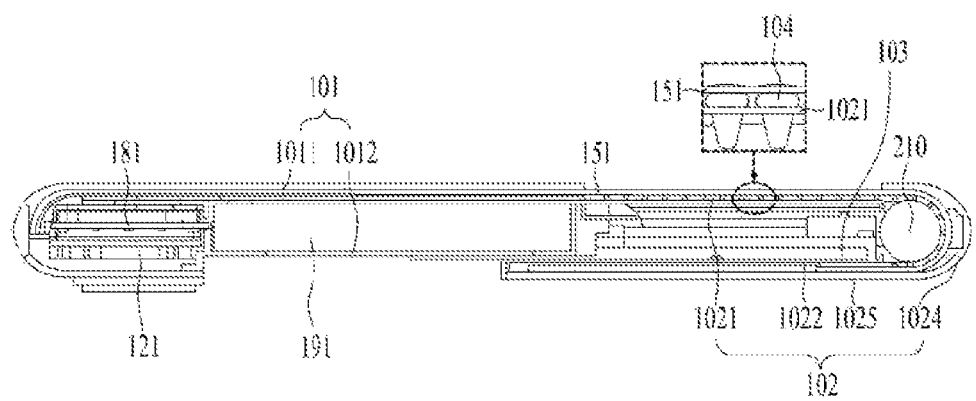
(b)

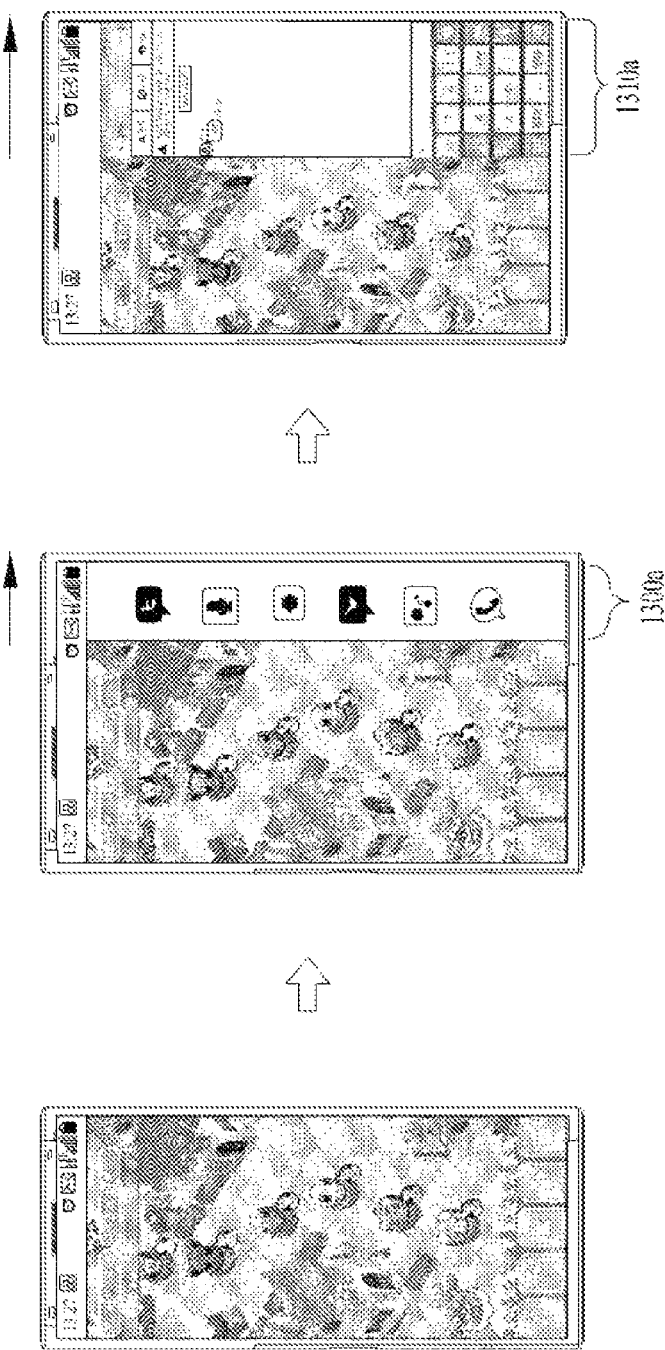

MOBILE TERMINAL AND CONTROL METHOD THEREFOR

CROSS REFERENCE TO RELATED APPLICATION(S)

This application is a continuation of U.S. patent application Ser. No. 16/992,060, filed on Aug. 12, 2020, which, pursuant to 35 U.S.C. § 119 (a), claims the benefit of an earlier filing date and right of priority to International Application No. PCT/KR2020/007562, filed on Jun. 11, 2020, the contents of which are hereby incorporated by reference herein in its entirety.

BACKGROUND

Field

The present disclosure relates to a mobile terminal and a control method therefor. More particularly, the present disclosure relates to a mobile terminal for activating a touch function after activating an output function when a display is extended, and deactivating the output function after deactivating the touch function when the display is contracted, and a control method therefor.

Discussion of the Related Art

Terminals may be generally classified into mobile/portable terminals or stationary terminals according to mobility thereof. Mobile terminals may also be classified into handheld terminals or vehicle mounted terminals according to whether or not a user can directly carry the terminal.

Functions of mobile terminals are diversifying. For example, the functions include data and voice communication, photography and video capture using a camera, voice recording, music file playback through a speaker system, and image or video output on a display. Some terminals additionally have an electronic gaming function or perform multimedia player functions. Recent mobile terminals may receive multicast signals that provide visual content such as broadcast, videos, or television programs.

As functions of such terminals are diversified, the terminals are implemented in the form of a multimedia player equipped with composite functions such as photograph or video capture, music or video file playback, and broadcast reception.

To support and increase the functions of the terminals, improvement of a structural part and/or software part of the terminals may be considered.

Recently, a flexible display having sufficient elasticity and capable of large deformation has been developed. The size of a mobile terminal may be adjusted using the deformable nature of the flexible display.

In the case in which the size of a front display is changeable, if a user touches the display while the flexible display is extended or contracted, malfunction may occur due to a touch operation of the user.

Although the flexible display has been developed up to now, since the flexible display is not available in the market, there are not many embodiments of a method of preventing malfunction caused by a touch operation of the user when the flexible display is extended or contracted.

SUMMARY

An object of the present disclosure is to solve the above problem and other problems.

Another object of the present disclosure is to provide a mobile terminal for activating a touch function after activating an output function when a display is extended and deactivating the output function after deactivating the touch function when the display is contracted, and a control method therefor.

To achieve these objects and other advantages and in accordance with the purpose of the disclosure, as embodied and broadly described herein, a mobile terminal includes a body, an input unit configured to receive a user input, a display coupled to the body to vary a display region viewed from a front of the body according to switching between an enlarged display mode and a reduced display mode, and a controller. The controller controls the display to be extended by a first region upon receiving a first signal, and controls the display to activate a touch function of the first region after activating an output function of the first region, based on extension of the display by the first region.

According to an aspect of the present disclosure, the controller may control the display to be contracted by a second region upon receiving a second signal, and control the display to deactivate an output function of the second region after deactivating a touch function of the second region, based on contraction of the display by the second region.

According to an aspect of the present disclosure, the controller may control the display to be further extended by a third region upon receiving a third signal for further extending the display after the display is extended by the first region, and control the display to activate a touch function of the third region after activating an output function of the third region, based on extension of the display by the third region.

According to an aspect of the present disclosure, the controller may control the display to be further contracted by a fourth region upon receiving a fourth signal for further contracting the display after the display is contracted by the second region, and control the display to deactivate an output function of the fourth region after deactivating a touch function of the fourth region, based on contraction of the display by the fourth region.

According to an aspect of the present disclosure, the controller may control the display to output first content in the extended first region.

According to an aspect of the present disclosure, the first region may be a region for maximally extending the display in the enlarged display mode.

According to an aspect of the present disclosure, the controller may control the display to output second content in the first region based on the first region of maximally extending the display.

According to an aspect of the present disclosure, at least one of the first, second, third, or fourth signal may be related with occurrence of an event.

According to an aspect of the present disclosure, the controller may determine sizes of the first to fourth regions extended or contracted based on occurrence of the event.

According to an aspect of the present disclosure, the controller may control the size of the display which is extended or contracted to return to an original size based on end of the event.

According to an aspect of the present disclosure, the controller may control the display to be extended by the first region upon receiving the first signal while third content is being output in the displayed and control the display to extensively output the third content in the extended first region.

According to an aspect of the present disclosure, the controller may gradually control the output function and the touch function based on the display extended or contracted by the first to fourth regions.

According to an aspect of the present disclosure, upon sensing a touch input signal in the first region based on reception of the first signal, the controller may control the display not to activate the touch function of the first region until the display is fully extended.

According to an aspect of the present disclosure, the first region and the second region may be set by a user.

According to an aspect of the present disclosure, the second region may be a region for minimally contracting the size of the display in the contracted display mode.

According to an aspect of the present disclosure, the body may include a first frame and a second frame and the second frame may be extendablee or contractible from the first frame.

According to an aspect of the present disclosure, the controller controls the display to operate in the enlarged display mode based on extension of the second frame and operate in the reduced display mode based on contraction of the second frame.

According to an aspect of the present disclosure, the display may include a flexible display surrounding the front, a side, and a rear of the body, and the controller may control the display to move a display portion positioned on the side of the body to the front of the body and move a display portion positioned on the rear of the body to the front of the body via the side of the body, based on extension of the second frame, and control the display to move a display portion positioned on the front of the body to the side of the body or to the rear of the body via the side of the body, based on contraction of the second frame.

According to an aspect of the present disclosure, the mobile terminal may further include a driving unit configured to extend or contract the second frame.

In another aspect of the present disclosure, a method of controlling a mobile terminal, the mobile terminal including a display coupled to a body to vary a display region viewed from a front of the body according to switching between an enlarged display mode and a reduced display mode, includes controlling the display to be extended by a first region upon receiving a first signal, controlling the display to activate a touch function of the first region after activating an output function of the first region, based on extension of the display by the first region. controlling the display to be contracted by a second region upon receiving a second signal, and controlling the display to deactivate an output function of the second region after deactivating a touch function of the second region, based on contraction of the display by the second region.

Further scopes of applicability of the present disclosure will become apparent from the following detailed description. However, those skilled in the art may understand that various modifications and changes may be possible within the concept and scope of the present disclosure and the detailed description and specific examples, such as exemplary embodiments of the disclosure, will be given by way of illustration only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a side view of the mobile terminal as viewed from a third direction;

FIG. 7 is a view showing a driving unit of the mobile terminal in accordance with an embodiment;

FIG. 8 is a cross-sectional view taken along lines A-A and B-B in FIG. 2;

FIG. 13 is a diagram illustrating an embodiment of outputting content in an extended region in a mobile terminal according to an embodiment of the present disclosure;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
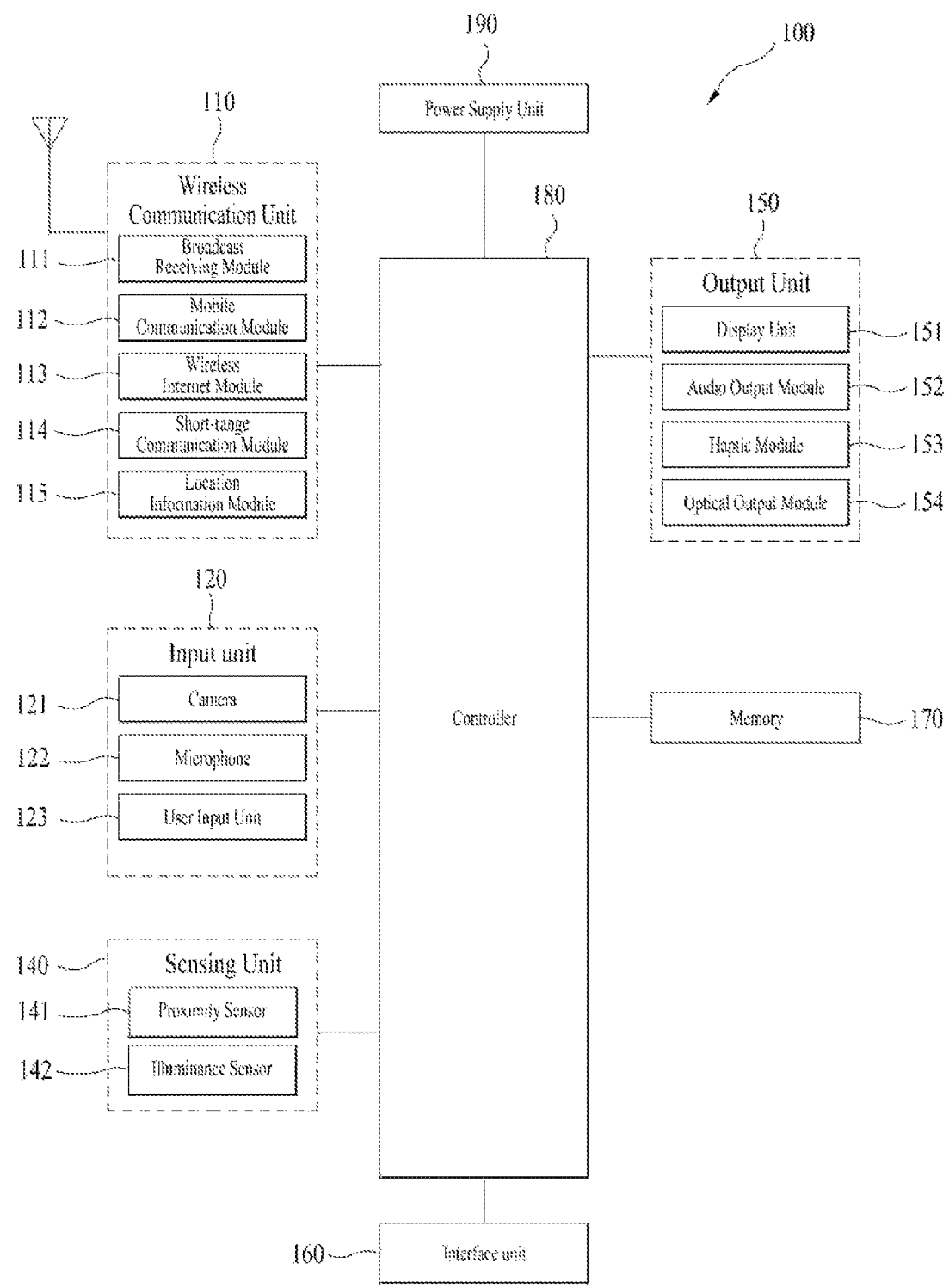
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
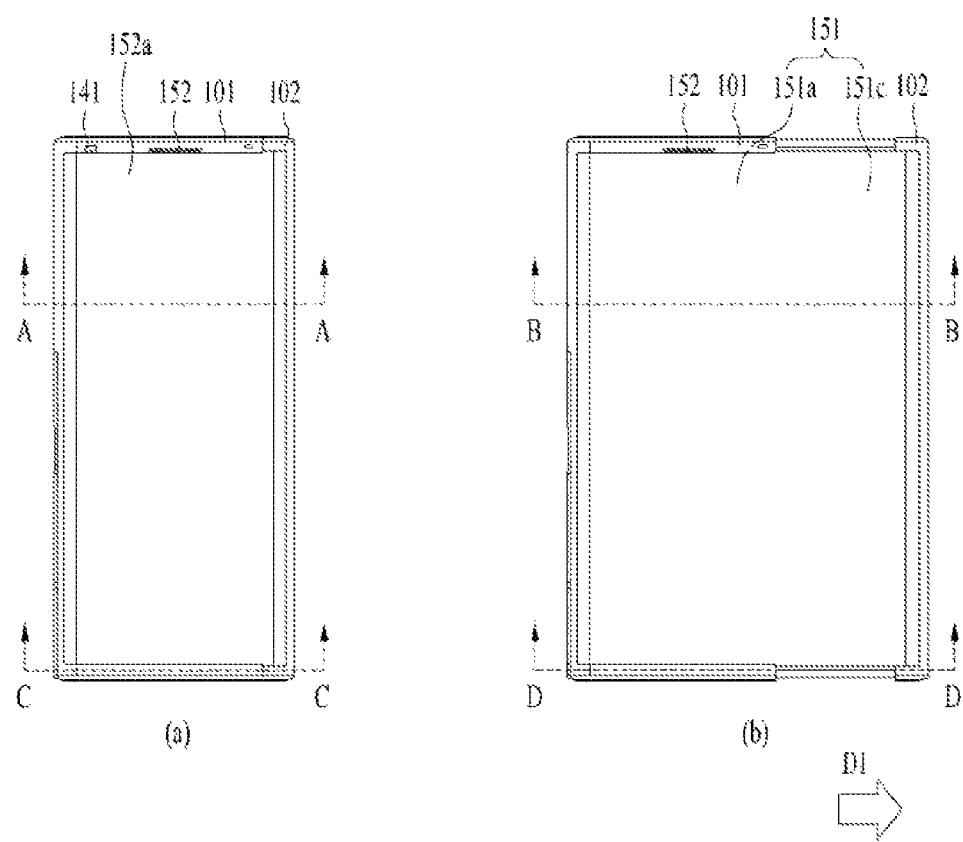
FIG. 2 is a front view of a first state and a second state of the mobile terminal in accordance with an embodiment.
Figure 3:
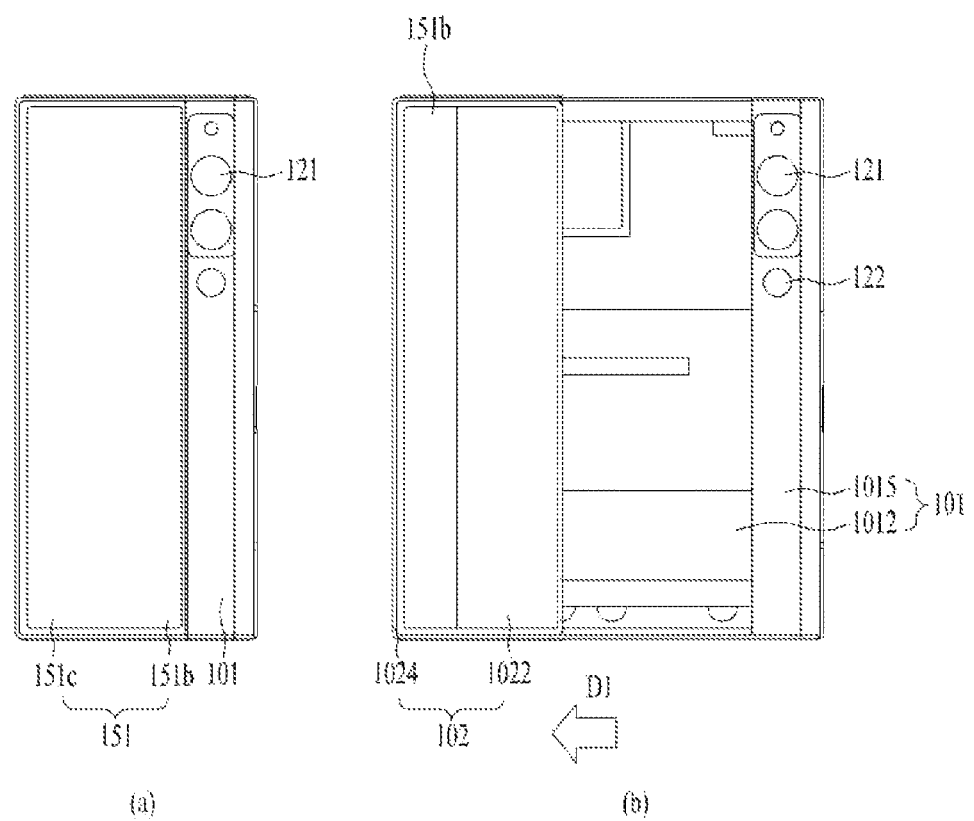
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
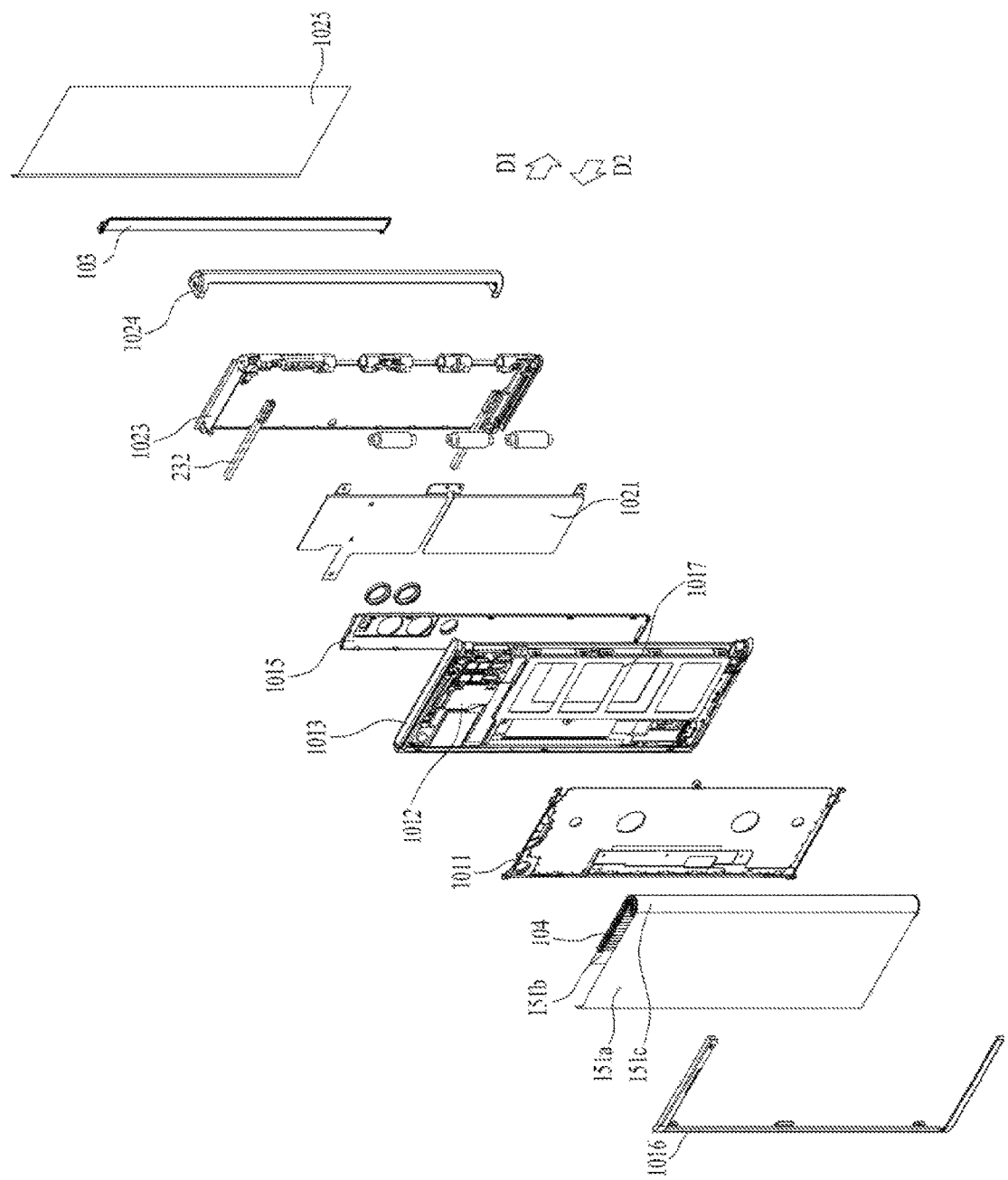
FIGS. 4 and 5 are exploded perspective views of the mobile terminal in accordance with an embodiment.
Figure 5:
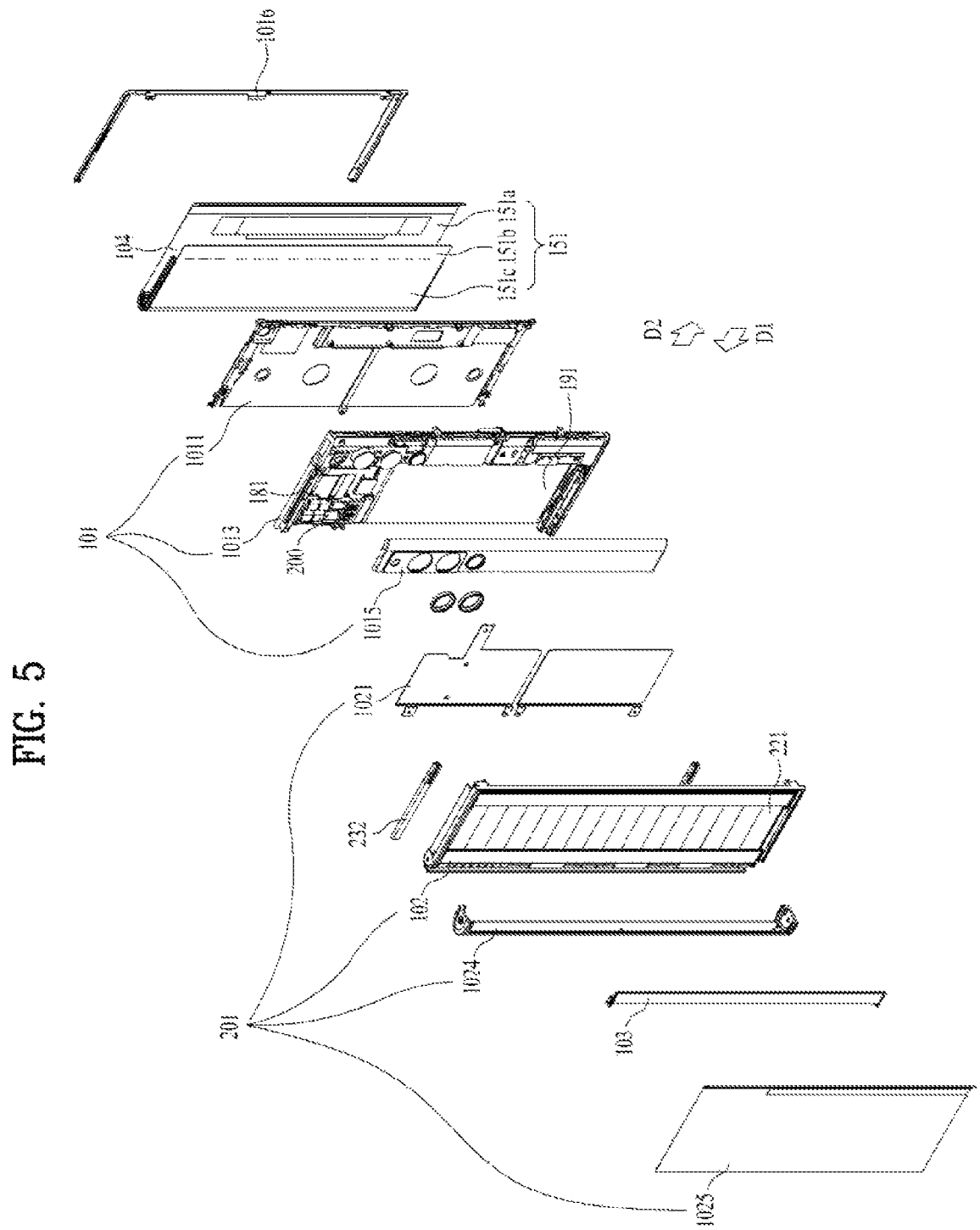

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151*a* and 151*b* and a variable portion 151*c*. The fixed portion 151*a* and 151*b* means a portion fixed to the frame. Because of being fixed to the frame, the fixed portion 151*a* and 151*b* maintains a constant shape without changing a bending degree. On the other hand, the variable portion 151*c* means a portion in which a bending angle or a position of the bent portion changes. The variable portion 151*c* in which the position or bending angle of the bent portion changes requires a structure for supporting a rear face of the variable portion 151*c* in response to the change.

The fixed portion 151*a*, 151*b* is coupled to the first frame of the display unit and is always positioned on the front face of the display unit to form a portion of the front face of the display unit. The variable portion 151*c* includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151*c* may be the front face and another portion of the variable portion 151*c* may be the rear face based on the first and second states. The variable portion 151*c* is positioned in the first direction with respect to the fixed portion 151*a*, 151*b* relative to the mobile terminal, and an end of the variable portion 151*c* is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(*a*), and may be exposed rearward in the second state as shown in FIG. 3(*b*).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151a disposed on the front of the mobile terminal 100, a second region 151b coupled to a slide frame 103 positioned on the rear of the mobile terminal 100, and a third region 151c located between the first region 151a and the second region 151b and bent around the roller 210. The third region 151c may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the roller 210. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4B, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

FIG. 7 is a view showing a driving unit 200 of the mobile terminal 100 in accordance with an embodiment. FIG. 7(a) shows the first state and FIG. 7(b) shows the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(*b*), when switch to the second state occurs, the rolling plate 104 may move to the front and the rolling plate 104 may be positioned on the front portion of the second frame 102.

The third region 151*c* of the display unit 151 in which the rolling plate 104 is positioned is a portion where bending deformation occurs when switch from the first state to the second state occurs. Accordingly, the rolling plate 104 may be deformed according to deformation of the third region 151*c*. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
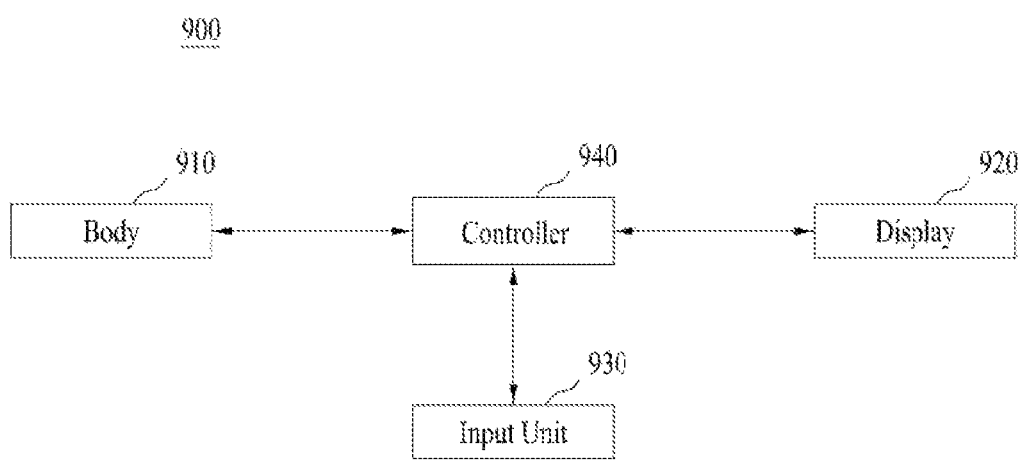
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, and a controller 940.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

The mobile terminal 900 may further include a driving unit (not illustrated) for causing the second frame to be extended or contracted. Here, the driving unit may be implemented as the driving unit 200 of FIG. 7.

The mobile terminal 900 may operate in an enlarged display mode as the second frame is extended, and may operate in a reduced display mode as the second frame is contracted. The extended display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

In addition, as the second frame is contracted, the display portion positioned on the front of the body 910 may move to the side of the body 910 or to the rear of the body 910 via the side of the body 910.

In an embodiment of the present disclosure, a state in which the second frame is not extended, i.e., a state in which the mobile terminal 900 is in the reduced display mode, may be defined as a default state.

The display 920 may display visual information. The visual information may include text, indicators, icons, content, applications, images, and videos. The display 920 may output visual information on a screen based on a control command of the controller 940.

When the display 920 switches to the enlarged display mode according to a signal, the display 920 may output visual information on the display 920 which is extended based on a control command of the controller 940. In particular, when the display 920 is extended, the display 920 may output the same or different content as or from previously output content in the extended region.

Although the display 920 may be implemented as a touch screen by forming an inter-layered structure or integrated structure with a touch sensor as described above in FIG. 1, an output function and a touch function of the display 920 may be individually controlled, which will be described below in detail with reference to drawings.

The input unit 930 may receive various inputs for the mobile terminal 900 from the user and transmit an input result so that the controller 940 may perform operations corresponding to the received inputs. In an embodiment of the present disclosure, the input unit 930 may be provided on the display 920 and may be implemented as a touch screen. Although the input unit 930 may be provided on the display 920, the input unit 930 may be separately controlled from the output function of the display 920. The input unit 930 may be implemented as the input unit 120 of FIG. 1.

The input unit 930 may detect a touch input from the user. In this case, the input unit 930 may detect a point at which the touch input is detected, a touched region, touched pressure, etc.

The input unit 930 may simply receive an input signal generated by touching an icon from the user and receive a touch drag input signal generated by touching an icon and then dragging the icon to the location of another icon.

The controller 940 may process data, control the units of the mobile terminal 900 described above, and control data transmission/reception between the units. In the present disclosure, the controller 940 may be implemented as the controller 180 of FIG. 1.

The operations performed by the mobile terminal 900 may be controlled by the controller 940. However, in the drawings and the following description, these operations will be collectively described, for convenience, as being performed/controlled by the mobile terminal 900.

Hereinafter, embodiments of the present disclosure will be described with reference to FIGS. 10 to 18. In describing and understanding the embodiments of the present disclosure, reference may be made to the above description given with reference to FIGS. 1 to 9.

Figure 10A:
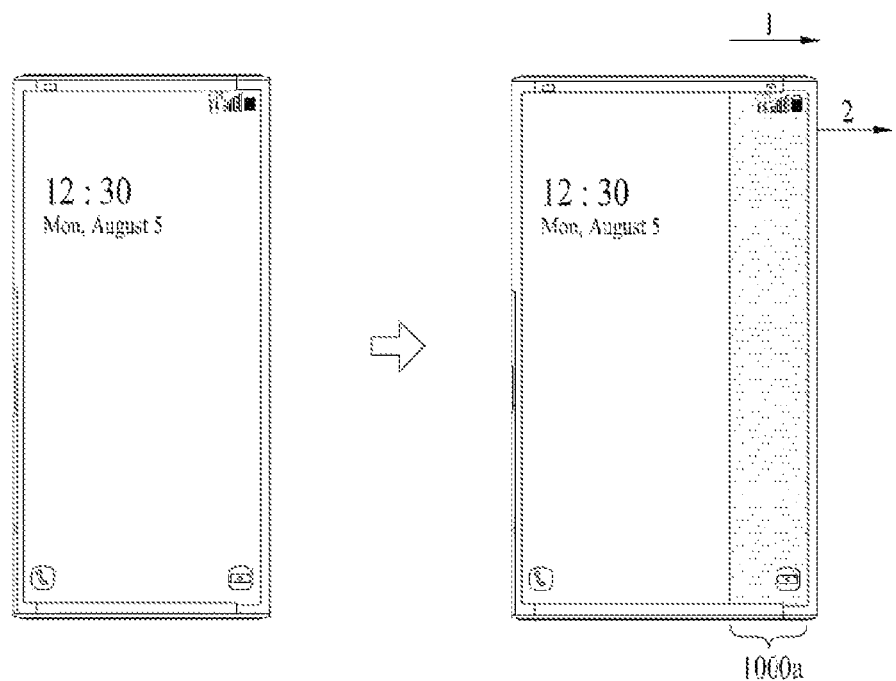
FIG. 10A is a diagram illustrating an embodiment of extending a display in a mobile terminal according to an embodiment of the present disclosure.
Figure 10B:
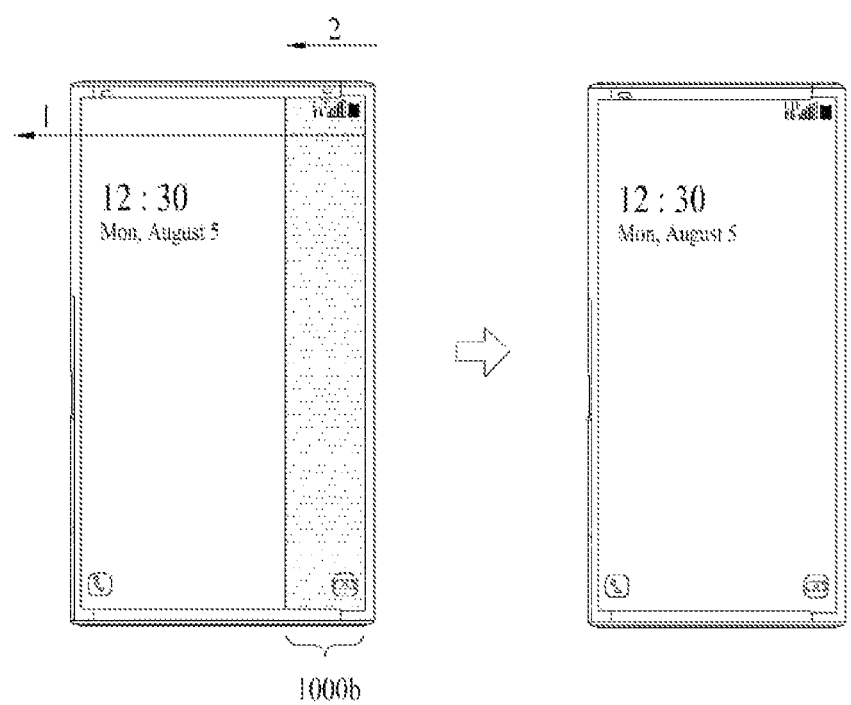
FIG. 10B is a diagram illustrating an embodiment of contracting a display in a mobile terminal according to an embodiment of the present disclosure.

FIGS. 10A and 10B illustrate an embodiment of individually controlling an output function and a touch function of a partial region of a display as a mobile terminal switches to an enlarged display mode or a reduced display mode.

FIG. 10A is a diagram illustrating an embodiment of extending a display in a mobile terminal according to an embodiment of the present disclosure.

Upon receiving a first signal, the mobile terminal may control the display to be extended by a first region 1000a.

The first signal may include the force of the user for manually extending the display, a power source, a signal applied on the driving unit that automatically moves the second frame, occurrence of an event, and the like.

For example, the first signal may correspond to a signal for causing the display to switch to the enlarged display mode (e.g., the case in which the user selects a physical button provided on the mobile terminal or an enlarged display mode switching button which is output on the display). As the mobile terminal receives the signal for causing the display to switch to the enlarged display mode, the mobile terminal may control the display to be extended by the first region 1000a.

In addition, as the mobile terminal receives the first signal in the reduced display mode, the mobile terminal may control the display to be extended by the first region 1000a.

When the display is extended by the first region 1000a, the mobile terminal may control the display to activate the touch function of the first region 1000a after activating the output function of the first region 1000a. Accordingly, the mobile terminal may determine a touch input of the user, which is input to the first region 1000a before the touch function is activated, as an invalid input.

Here, the output function may correspond to a function for causing the display to output visual information and the touch function may correspond to a function for causing the display to operate as a touch screen and then receive a touch input from the user.

More specifically, in order to extend the display by the first region 1000a, the mobile terminal may move a region located on the rear face of the display to the front face of the display. In this process, a display region located on the rear face of the display may move to the front face via the side face of the mobile terminal.

In this case, when the touch function is activated while the first region 1000a is located on the rear face or the side face, malfunction may occur while the hand of the user touches the first region 1000a.

To prevent this phenomenon, the activation of the touch function may be delayed in a process of moving the first region 1000a of the display to the front face from the rear face or the side face, thereby lowering the risk of occurrence of touch malfunction.

That is, the mobile terminal of the present disclosure using a flexible display has the rear face and the side face composed of the display unlike other general mobile terminals. Since the user uses the mobile terminal in a state in which the user grasps the rear face or side face of the mobile terminal by the hand, an issue touch malfunction may occur.

Accordingly, in an embodiment of the present disclosure, when the display is extended by the first region 1000a, the probability of touch malfunction by the user may be lower by activating the touch function of the first region 1000a after activating the output function of the first region 1000a.

In an embodiment of the present disclosure, the first region 1000a may be a region for maximally extending the display in the enlarged display mode.

More specifically, upon receiving the first signal, the mobile terminal may extend the size of the display viewed from the front face to the maximum. In this case, the first signal may correspond to a signal for controlling the display to switch to the enlarged display mode and controlling the display to be extended to the maximum.

Upon receiving the first signal, the mobile terminal may change the size of the display viewed from the front face to the largest size. That is, the first region 1000a, which is an extended region, may correspond to a region for making the size of the display largest in the enlarged display mode.

On the other hand, when the mobile terminal switches to the enlarged display mode, the display may not be fully extended at one time. This will be described in detail with reference to FIG. 11A.

FIG. 10B is a diagram illustrating an embodiment of contracting a display in a mobile terminal according to an embodiment of the present disclosure. Hereinafter, a description overlapping with that of FIG. 10A will be omitted.

Upon receiving a second signal, the mobile terminal may control the display to be contracted by a second region 1000b.

Here, the second signal may include the force of the user for manually contracting the display, a power source, a signal applied on the driving unit that automatically moves the second frame, occurrence of an event, and the like.

For example, the second signal may correspond to a signal for causing the display to switch to the reduced display mode. In this case, as the mobile terminal receives the signal for causing the display to switch to the reduced display mode, the mobile terminal may control the display to be contracted by the second region 1000b.

When the display is contracted by the second region 1000b, the mobile terminal may control the display to deactivate the output function of the second region 1000b after deactivate the touch function of the second region 1000b. Accordingly, if the touch function of the second region 1000b is deactivated, the mobile terminal may determine a touch input of the user, which is input to the second region 1000b, as an invalid input.

More specifically, unlike the case in which the display is extended, the mobile terminal may move a region located on the front face of the display to the rear face of the display in order to contract the display by the second region 1000b. In this process, a partial region of the display located on the front face may move to the rear face via the side face of the mobile terminal. In this case, when the touch function is activated while the second region 1000b is positioned on the front face or the side face, touch malfunction may occur due to the hand of the user.

To prevent this phenomenon, in a process of moving the second region 1000b of the display to the rear face from the front face or the side face, the mobile terminal may control the display to deactivate the touch function first and then deactivate the output function.

In an embodiment of the present disclosure, the second region 1000b may be a region for minimally reducing the size of the display in the reduced display mode.

More specifically, upon receiving the second signal, the mobile terminal may minimally contract the display so that the display region viewed from the front face is minimized. In this case, the second signal may correspond to a signal for controlling the display to switch to the reduced display mode and controlling the display to be contracted to the smallest size.

Upon receiving the second signal, the mobile terminal may change the size of the display viewed from the front face to the smallest size. That is, the second region 1000b, which is a contracted region, may correspond to a region for making the size of the display smallest in the reduced display mode.

The embodiment of FIG. 10B illustrates an order in which the touch function is deactivated and the output function is deactivated when the second region 1000b is gradually contracted. When the display switches to the reduced display mode and the second region 1000b is positioned on the side face or rear face of the display, it is apparent that at least one of the touch function or the output function may maintain a deactivated state.

That is, although not described in detail in FIGS. 10A and 10B, the mobile terminal may maintain at least one of the output function or the touch function of the side face or the rear face of the display in a deactivated state.

When the mobile terminal switches to the reduced display mode, the display may not be reduced to the minimum at one time. This will be described in detail with reference to FIG. 11B.

Figure 11A:
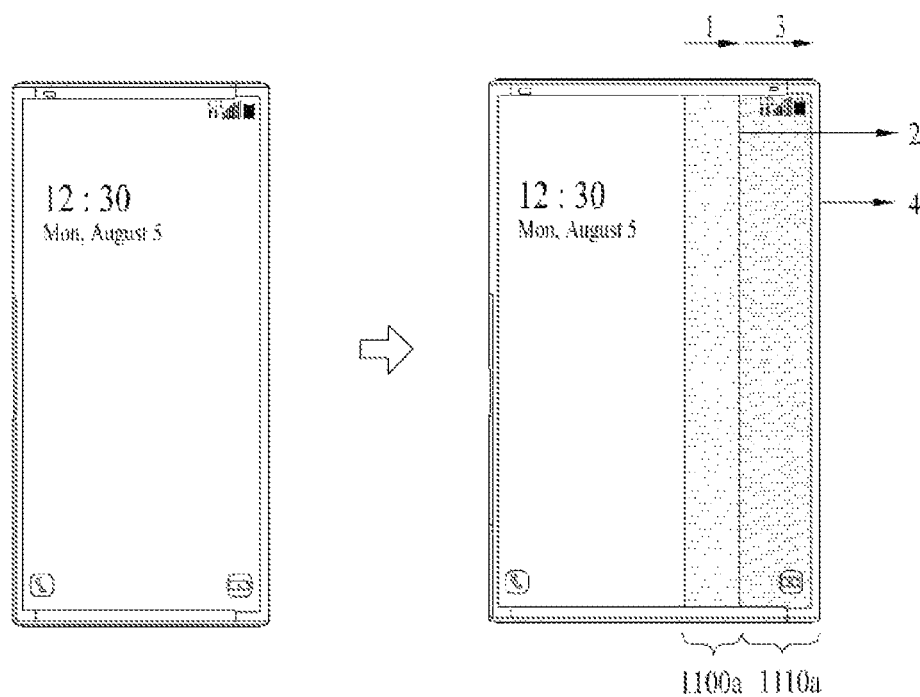
FIG. 11A is a diagram illustrating an embodiment of partially extending a display in a mobile terminal according to an embodiment of the present disclosure.
Figure 11B:
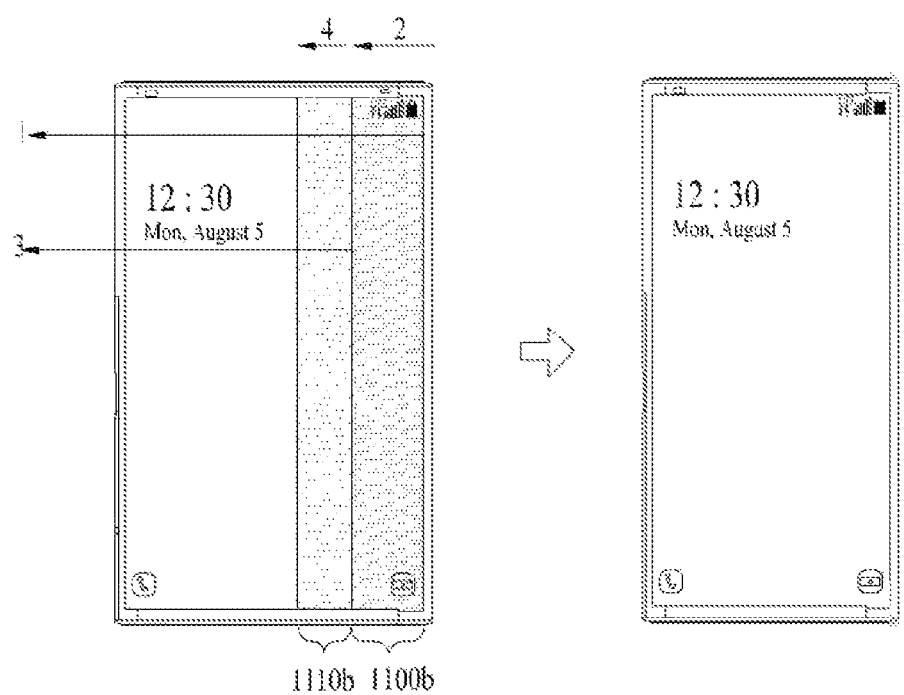
FIG. 11B is a diagram illustrating an embodiment of partially contracting a display in a mobile terminal according to an embodiment of the present disclosure.

FIGS. 11A and 11B are diagrams illustrating an embodiment in which a display is not extended or contracted at one time when the mobile terminal switches to an enlarged display mode or a reduced display mode.

FIG. 11A is a diagram illustrating an embodiment of partially extending a display in a mobile terminal according to an embodiment of the present disclosure.

After the display is extended by a first region 1100a, the mobile terminal may control the display to be further extended by a second region 1110a upon receiving a second signal for further extending the display.

The second signal may correspond to the same signal as or a different signal from the first signal in FIG. 10A.

When the display is extended by the second region 1110a, the mobile terminal may activate the touch function of the second region 1110a after activating the output function of the second region 1110a.

That is, when the display is extended by the first region 1100a according to the first signal, the mobile terminal may activate the touch function of the first region 1100a after activating the output function of the first region 1100a. Next, when the display is further extended by the second region 1110a according to the second signal, the mobile terminal may activate the touch function of the second region 1110a after activating the output function of the second region 1110a.

In an embodiment of the present disclosure, in order to extend a display region viewed from the front, the mobile terminal needs to move the display located on the rear face or side face to the front face. In this case, the display region may be partially divided. Then, the output function of the divided region is activated first and the touch function of the divided region is activated later so that the possibility of touch malfunction may be lowered.

In addition, the first region 1100a and the second region 1110a may be set by the user. For example, when the horizontal length of the display to which a display region viewed from the front in the enlarged display mode is maximally extended is 150 mm and the horizontal length of the display to which the display region viewed from the front in the reduced display mode is minimally contracted is 75 mm, the user of the mobile terminal may set the horizontal length of the first region 1100a to 40 mm and set the horizontal length of the second region 1110a to 35 mm.

Accordingly, as the mobile terminal receives a signal for switching from the reduced display mode to the enlarged display mode, the mobile terminal may primarily extend the horizontal length of the display by 40 mm, activate the output function of a region corresponding to 40 mm, and then activate the touch function of the region corresponding to 40 mm.

Similarly, after activating the touch function of the region corresponding to 40 mm, the mobile terminal may secondarily extend the horizontal length of the display by 35 mm, activate the output function of the region corresponding to 35 mm, and then activate the touch function of the region corresponding to 35 mm. This will be described below once more with reference to FIGS. 12A, 12B, and 16.

FIG. 11A illustrates an embodiment of extending the display only by the first region 1100a by receiving the first signal and further extending the display only by the second region 1110a by receiving the second signal. However, the first signal and the second signal may correspond to signals that may be input and received simultaneously.

Accordingly, the first region 1100a may be extended in response to the first signal, and the second region 1110a may be extended even if the second signal is not received separately. Thus, the embodiment in which the first region 1100a is extended in response to the first signal and the second region 1110a is extended in response to the second signal may be expanded gradually or naturally.

In addition, while FIG. 11A illustrates an embodiment of extending the display only by the first region 1100a by receiving the first signal and further extending the display only by the second region 1110a by receiving the second signal, it is apparent that an embodiment of extending the display by n regions by receiving n signals (where n is an integer) may also be considered.

FIG. 11B is a diagram illustrating an embodiment of partially contracting display in a mobile terminal according to an embodiment of the present disclosure. Hereinafter, a description overlapping with that of FIG. 11A will be omitted.

After the display is contracted by a first region 1100b, the mobile terminal may control the display to be further extended by a second region 1110b upon receiving a second signal for further contracting the display.

The second signal may correspond to the same signal as or different signal from the first signal in FIG. 10B.

When the display is contracted by the second region 1110b, the mobile terminal may deactivate an output function of the second region 1110b after deactivating a touch function of the second region 1110b.

That is, when the display is contracted by the first region 1100b according to the first signal, the mobile terminal may deactivate the output function of the first region 1100b after deactivating the touch function of the first region 1100b. Next, when the display is further contracted by the second region 1110b according to the second signal, the mobile terminal may deactivate the output function of the second region 1110b after deactivating the touch function of the second region 1110b.

In an embodiment of the present disclosure, in order to contract a display region viewed from the front, the mobile terminal needs to move the display located on the front face to the rear face or side face. In this case, the display region may be partially divided. Then, the touch function of the divided region is deactivated first and the output function of the divided region is deactivated later so that the possibility of touch malfunction may be lowered.

As in the embodiment of the FIG. 11A, the first region 1100b and the second region 1110b may be set by the user. Accordingly, when the size of the display is determined in the enlarged display mode and in the reduced display mode, the user may set the sizes of the first region 1100b and the second region 1110*b* in a process of switching between the enlarged display mode and the reduced display mode, thereby individually controlling the output function and the touch function in each region.

Figure 12A:
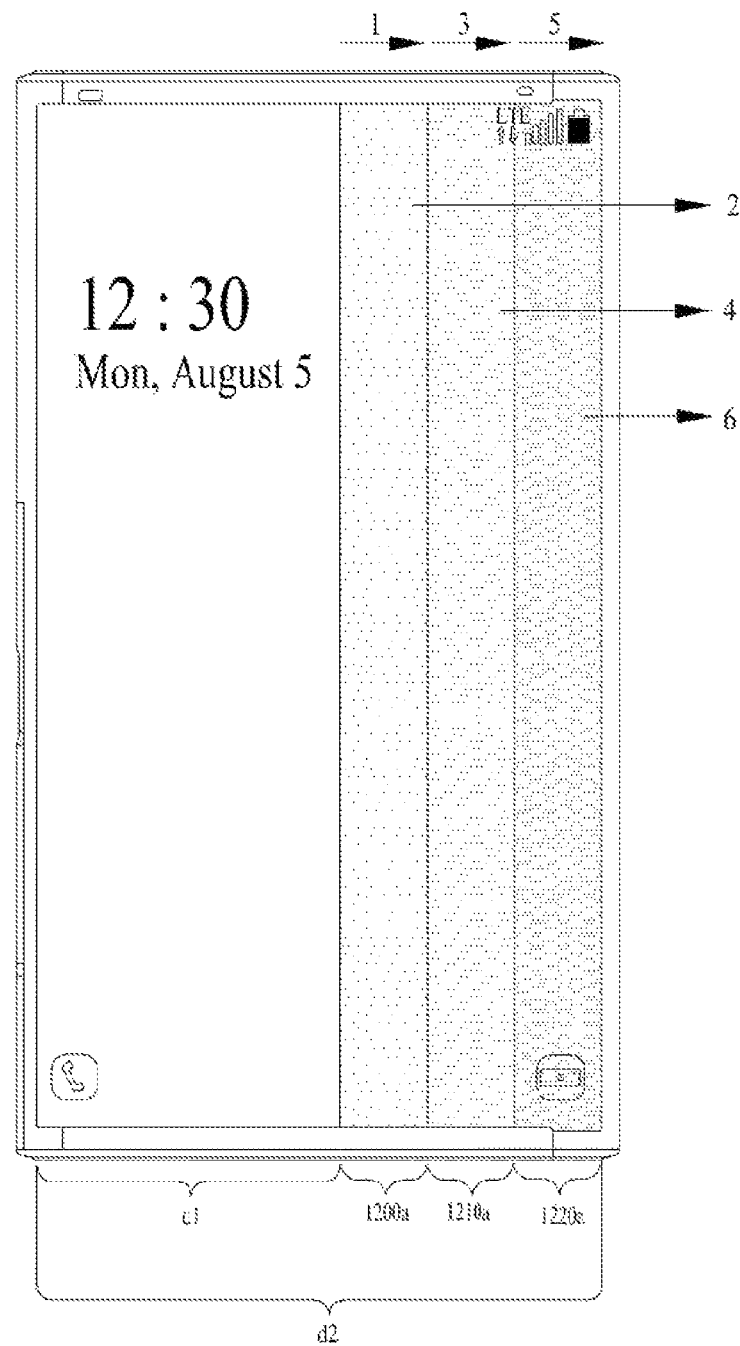
FIG. 12A is a diagram illustrating an embodiment of setting an extended region by a user in a mobile terminal according to an embodiment of the present disclosure.

FIG. 12A is a diagram illustrating an embodiment of setting an extended region by a user in a mobile terminal according to an embodiment of the present disclosure.

Referring to FIG. 12A, the mobile terminal may receive information about a first region 1200*a*, a second region 1210*a*, and a third region 1220*a* from the user.

More specifically, the user may determine to which degree the user will extend or contract the display at one time in a process in which the display switches to the enlarged display mode or the reduced display mode. This is because users using the mobile terminal differ in the sizes of the hands and thus the horizontal length of the mobile terminal making the user feel comfortable when the user holds the mobile terminal may differ.

In order to compensate for this viewpoint, in an embodiment of the present disclosure, the user may set a degree to which the display is extended or contracted in the process the mobile terminal switches to the enlarged display mode or the reduced display mode.

Referring to the above-described example, when a horizontal length d2 of the display to which a display region viewed from the front in the enlarged display mode is maximally extended is 150 mm, and a horizontal length d1 of the display to which the display region viewed from the front in the reduced display mode is minimally contracted is 75 mm, the user may set the horizontal length of the first region 1200*a* to 25 mm, the horizontal length of the second region 1210*a* to 25 mm, and the horizontal length of the third region 1220*a* to 25 mm.

In this way, as the display switches between the enlarged display mode and the reduced display mode, the mobile terminal may gradually extend or contract the display by dividing a region which is extended or reduced at one time into three regions.

Referring to 12A, when the mobile terminal receives a control signal for switching from the reduced display mode to the enlarged display mode, the mobile terminal may extend the display by the first region 1200*a*, activate the output function of the first region 1200*a*, and then activate the touch function of the first region 1200*a*. Next, the mobile terminal may further extend the display by the second region 1210*a*, activate the output function of the second region 1210*a*, and then activate the touch function of the second region 1210*a*. Next, the mobile terminal may further extend the display by the third region 1220*a*, activate the output function of the third region 1220*a*, and then activate the touch function of the third region 1220*a*.

That is, upon receiving the control signal for switching to the enlarged display mode when the horizontal length of the display is 75 mm, the mobile terminal may gradually extend the display by 25 mm at one time, activate the output function corresponding to the extended region, and then active the touch function corresponding to the extended region.

While the embodiment of switching from the reduced display mode to the enlarged display mode at a time through one control signal has been described in FIG. 12A, an embodiment of extending the display by the first region 1200*a* through a first signal, extending the display by the second region 1210*a* through a second signal, and extending the display by the third region 1210*a* through a third signal is also applicable in other drawings.

In addition, although in FIG. 12A, the extendable region is divided into three regions in the process of switching from the reduced display mode to the enlarged display mode, this is purely exemplary and the extendable region may be divided into fewer or more regions than the three regions.

Figure 12B:
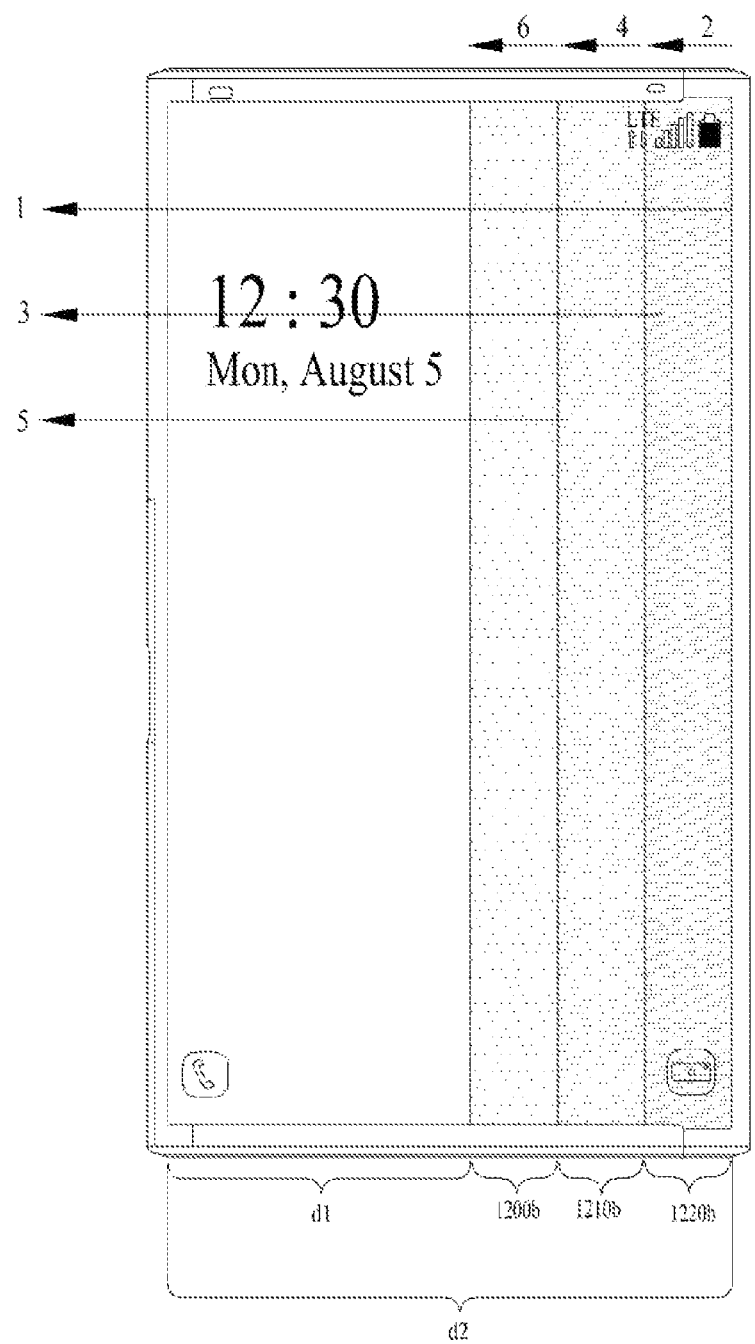
FIG. 12B is a diagram illustrating an embodiment of setting a contracted region by a user in a mobile terminal according to an embodiment of the present disclosure.

FIG. 12B is a diagram illustrating an embodiment of setting a contracted region by a user in a mobile terminal according to an embodiment of the present disclosure.

Similarly to FIG. 12A, referring to FIG. 12A, the mobile terminal may receive information about a first region 1200*b*, a second region 1210*b*, and a third region 1220*b* from the user.

When a horizontal length d2 of the display to which a display region viewed from the front in the enlarged display mode is maximally extended is 150 mm, and a horizontal length d1 of the display to which the display region viewed from the front in the reduced display mode is minimally contracted is 75 mm, the user may set the horizontal length of the first region 1200*b* to 25 mm, the horizontal length of the second region 1210*b* to 25 mm, and the horizontal length of the third region 1220*b* to 25 mm.

In this way, as the display switches from the extended display mode to the reduced display mode, the mobile terminal may contract the display by dividing a region contracted at one time into three regions.

Referring to FIG. 12B, when the mobile terminal receives a control signal for switching from the enlarged display mode to the reduced display mode, the mobile terminal may contract the display by the third region 1220*b*, deactivate the touch function of the third region 1220*b*, and then deactivate the output function of the third region 1200*a*. Next, the mobile terminal may further contract the display by the second region 1210*b*, deactivate the touch function of the second region 1210*b*, and then deactivate the output function of the second region 1210*b*. Next, the mobile terminal may further contract the display by the first region 1200*b*, deactivate the touch function of the first region 1200*b*, and then deactivate the output function of the first region 1200*b*.

That is, upon receiving the control signal for switching from the enlarged display mode to the reduced display mode when the horizontal length of the display is 150 mm, the mobile terminal may gradually contract the display by 25 mm at one time, deactivate the touch function corresponding to the contracted region, and then deactivate the output function corresponding to the contracted region.

While an embodiment of switching from the enlarged display mode to the reduced display mode through one control signal has been described in FIG. 12B, an embodiment of contracting the display by the third region 1220*b* through a first signal, contracting the display by the second region 1210*b* through a second signal, and contracting the display by the first region 1200*b* through a third signal is also applicable.

In addition, although in FIG. 12B, the contractable region is divided into three regions in the process of switching from the enlarged display mode to the reduced display mode, this is purely exemplary and the contractable region may be divided into fewer or more regions than the three regions.

FIG. 13 is a diagram illustrating an embodiment of outputting content in an extended region in a mobile terminal according to an embodiment of the present disclosure.

Referring to the first drawing of FIG. 13, the mobile terminal may receive a control signal for switching from the reduced display mode to the enlarged display mode. In this case, the mobile terminal may control the display to output different content according to a degree to which the display is extended. In addition, the mobile terminal may determine a degree to which the display is extended according to the control signal.

For example, when receiving the first signal, the mobile terminal may extend the display by a first region 1300*a* and, when receiving a second signal, the mobile terminal may extend the display by a second region 1310*b*.

Referring to the second drawing of FIG. 13, the mobile terminal may control the display to output first content in the extended first region 1300*a*. Here, the first content may be determined based on the size of the first region 1300*a*. For example, the first content may correspond to a list of recently used application icons.

That is, since the first region 1300*a* corresponds to a narrow region, the mobile terminal may include application icons etc. as content that may be output in the first region 1300*a*.

In this case, the above-described embodiment may be applied. That is, when outputting the first content in the first extended region 1300*a*, the mobile terminal may activate a touch function corresponding to the first content after the first content is output Referring to the third drawing of FIG. 13, if the second region 1310*a* is an extended region when the display is extended to the maximum, the mobile terminal may control the display to output second content in the second region 1310*a*. Here, the second content may be determined based on the size of the second region 1310*a*. For example, the second content may correspond to an application that has been executed most lastly.

That is, if the second region 1310*a* is an extended region when the display is extended to the maximum, since the second region 1310*a* corresponds to a wide region, the mobile terminal may execute one independent application in the second region 1310*a*.

Likewise, when outputting the second content in the extended second region 1310*a*, the mobile terminal may activate a touch function corresponding to the second content after the second content is output.

While, in the embodiment of FIG. 13, only the embodiment of switching from the reduced display mode to the enlarged display mode has been described, it is apparent that an embodiment of switching from the enlarged display mode to the reduced display mode may also be included in the scope of the present disclosure.

Figure 14:
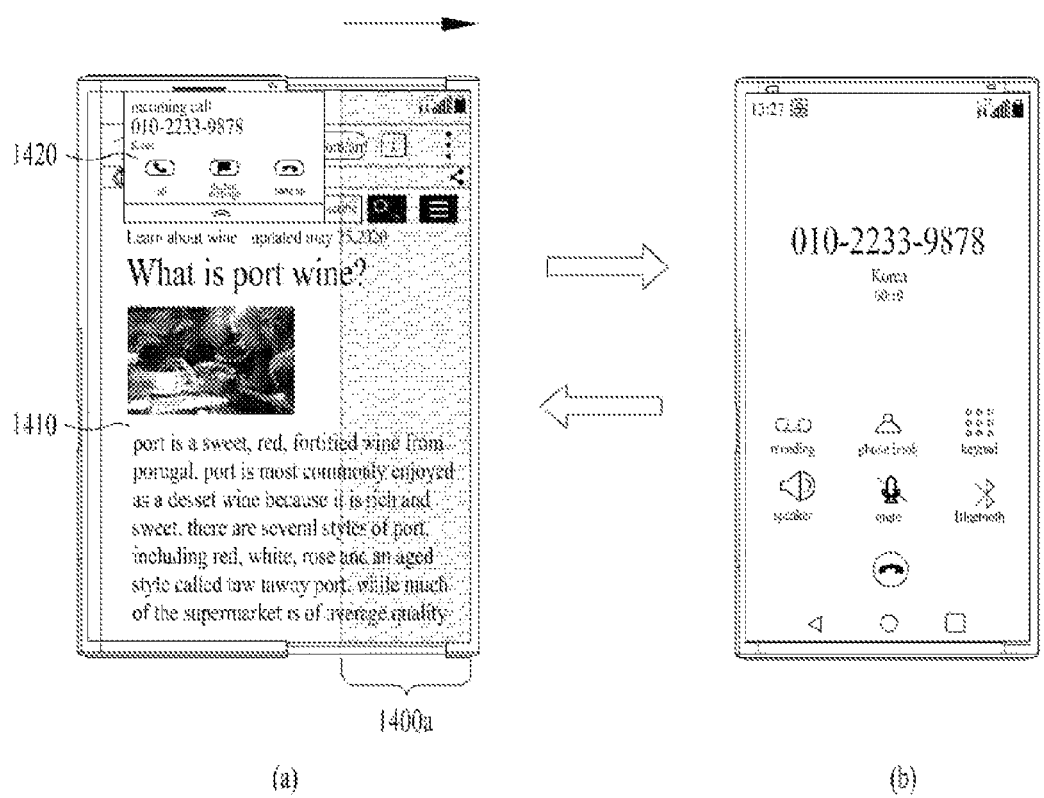
FIG. 14 is a diagram illustrating an embodiment of extending or contracting a display based on occurrence of an event in a mobile terminal according to an embodiment of the present disclosure.

FIG. 14 is a diagram illustrating an embodiment of extending or contracting a display based on occurrence of an event in a mobile terminal according to an embodiment of the present disclosure.

In the case of occurrence of an event, the mobile terminal may extend or contract the display upon receiving the event. Here, the event may include any event that the mobile terminal may receive. Receiving a call from an external terminal or receiving a message may be the event.

When the mobile terminal receives the event in the enlarged display mode, the mobile terminal may contract the display as illustrated in (b) of FIG. 14 from (a) of FIG. 14.

In more detail, referring to (a) of FIG. 14, the mobile terminal may output first content 1410 on a full screen in the enlarged display mode. In this case, the first content 1410 may correspond to a first application. For example, the first application may correspond to an ebook reader application.

In a state in which the first content 1410 is output in the enlarged display mode, the mobile terminal may receive an event. For example, the event may correspond to a phone call.

The mobile terminal may output a widget 1420 corresponding to the received event in a preset region of the display. In the example described above, when the event corresponds to a phone call, the widget 1420 may include information about the received call.

When receiving the event in the enlarged display mode, the mobile terminal may control the display to be contracted. In this case, the mobile terminal may determine whether to contract the display based on occurrence of the event.

More specifically, in the case of a mobile terminal having a display that is extended or contracted, applications that are convenient for the enlarged display mode and applications that are convenient for the reduced display mode may be distinguished.

For example, an e-book reader application may be convenient for the enlarged display mode, whereas a telephone application may be convenient for the reduced display mode.

Accordingly, the mobile terminal may switch from the enlarged display mode to the reduced display mode when the received event is a phone call.

Referring to (b) of FIG. 14, the mobile terminal may switch to the reduced display mode, end the output of first content 1410, and output an application corresponding to the generated event on the display that is contracted.

For example, the mobile terminal may switch to the reduced display mode, end the e-book application, and output the phone call application corresponding to the generated event on the display that is contracted. In this case, the e-book application may not be ended and may remain in a background.

The embodiments described previously may be applied to the embodiment of FIG. 14.

More specifically, in a process of switching from the enlarged display mode to the reduced display mode, the mobile terminal may deactivate the touch function of a first region 1400*a* which is contracted. For example, when receiving an event, the mobile terminal may deactivate the touch function of the first region 1400*a* that is contracted except for a region in which an application corresponding to the event is output.

That is, when receiving the event, the mobile terminal may immediately deactivate the touch function of the first region 1400*a* and then switch from the enlarged display mode to the reduced display mode.

In this case, the mobile terminal may determine the size of an extended or contracted region of the display based on the event that has occurred. The mobile terminal may determine the size of the extended or contracted region of the display according to which event occurs.

For example, when the event that has occurred is a phone call, it may be convenient for the user to minimize the size of the display, whereas when the event that has occurred is a text message, it may be convenient for the user to have a middle size between the enlarged display mode and the reduced display mode as the size of the display.

In consideration of this viewpoint, the mobile terminal may determine the size of the extended or contracted region of the display based on the event that has occurred. Obviously, the user may set the size of the extended or contracted region of the display as illustrated in FIG. 12A or 12B.

In an embodiment of the present disclosure, if the event ends, the mobile terminal may control the display to return the size of the display that is extended or contracted to an original size.

When the event occurring in the enlarged display mode ends in the reduced display mode, the mobile terminal may extend the display illustrated in (b) of FIG. 14 to an original state illustrated in (a) of FIG. 14.

For example, the mobile terminal may receive a phone call in the enlarged display mode, switch to the reduced display mode in response to the phone call, and output a phone call application on the display.

When the phone call is ended, the mobile terminal may terminate the phone call application and switch to the enlarged display mode. In this case, while the mobile terminal may switch to the enlarged display mode, the mobile terminal may activate the output function of the first region 1400a first and then activate the touch function of the first region 1400a.

Accordingly, when the event ends, the mobile terminal may switch to the enlarged display mode, output the first content 1410 that has originally been executed in the enlarged display mode, and activate the touch function of the first region 1400a after the first region 1400a is fully extended.

Similarly, when an event occurring in the reduced display mode ends in the enlarged display mode, the mobile terminal may contract the display to the original size.

Figure 15:
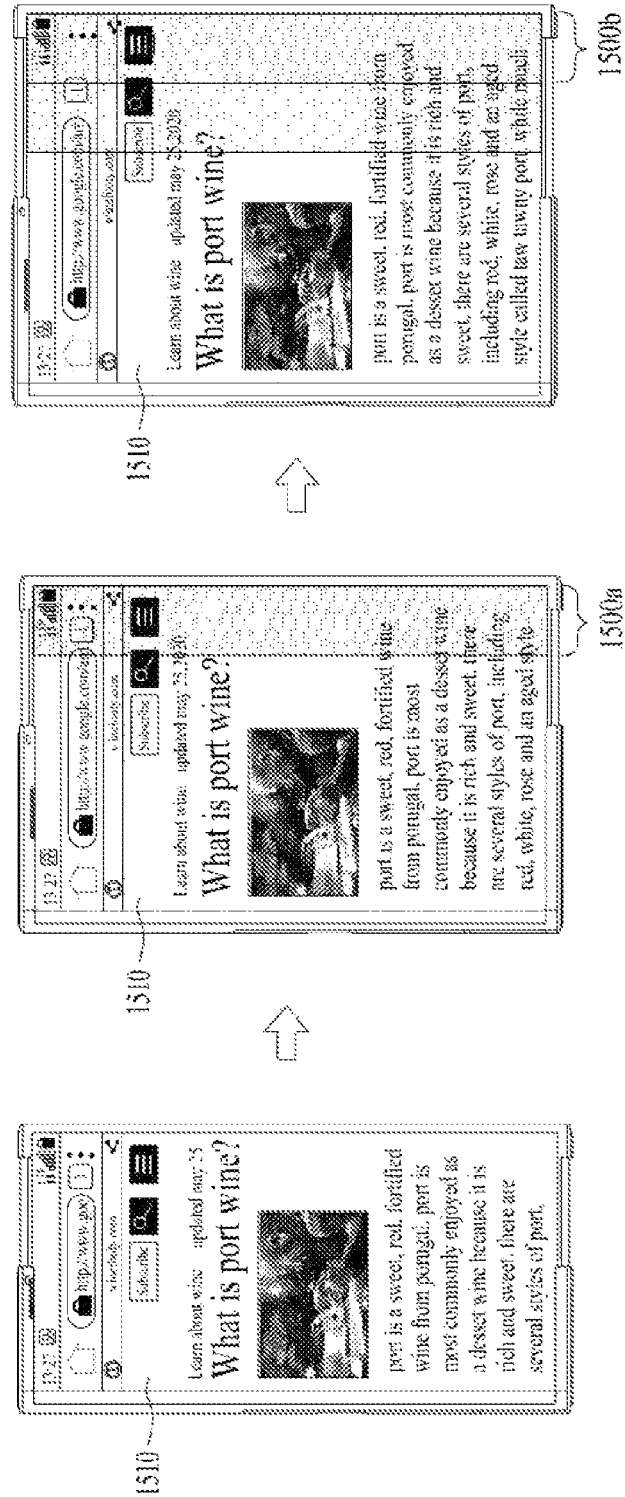
FIG. 15 is a diagram illustrating an embodiment of extensively outputting content which is being output in a mobile terminal according to an embodiment of the present disclosure.

FIG. 15 is a diagram illustrating an embodiment of extensively outputting content which is being output in a mobile terminal according to an embodiment of the present disclosure.

When the mobile terminal receives a signal while outputting content 1510 on the display, the mobile terminal extends the display by a first region 1500a and extensively output the content 1510 in the display which is extended by the first region 1500a.

Referring to the first drawing of FIG. 15, the mobile terminal may receive a signal for switching to the enlarged display mode while the content 1510 is output in the display in the reduced display mode.

Referring to the second drawing of FIG. 15, the mobile terminal may extend the display by the first region 1500a upon receiving the signal for switching to the enlarged display mode. In this case, the mobile terminal may extensively output the content 1510 which has been output, rather than new content, in the first region 1500a. Here, extensively outputting the content 1510 in the extended region may include not only outputting the content by physically extending the size of the content 1510 but also outputting the content 1510 of an extended mode when the content 1510 provides the extended mode.

In an embodiment of the present disclosure, when the display is extended by the first region 1500a, the mobile terminal may extensively output the content 1510 but may deactivate the touch function of the first region 1500a until the display is fully extended by the first 1500a.

Therefore, although the user may visually use the content 1510 which is being output on an extended screen, the touch function is activated after the display is extended so that a probability of touch malfunction may be prevented.

Referring to the third drawing of FIG. 15, the mobile terminal may further extend the display by a second region 1500b after the display is extended by the first region 1500a. Likewise, the mobile terminal may further extensively output the content 1510 which has been output.

In an embodiment of the present disclosure, when the mobile terminal further extends the display by the second region 1500b, the mobile terminal may extensively output the content 1510 but may deactivate the touch function of the second region 1500b until the display is fully extended by the second region 1500b.

In addition, when receiving a signal for switching to the enlarged display mode, the mobile terminal may seamlessly extend the first region 1500a and the second region 1500b. In this case, the mobile terminal may activate a function corresponding to an extended region in order of the output functions of the first region 1500a and the second region 1500b and the touch function of the first region 1500a and the second region 1500b. Further, the mobile terminal may gradually activate the output function and the touch function as the first region 1500a and the second region 1500b are extended. This will be described once more with reference to FIG. 16.

Figure 16:
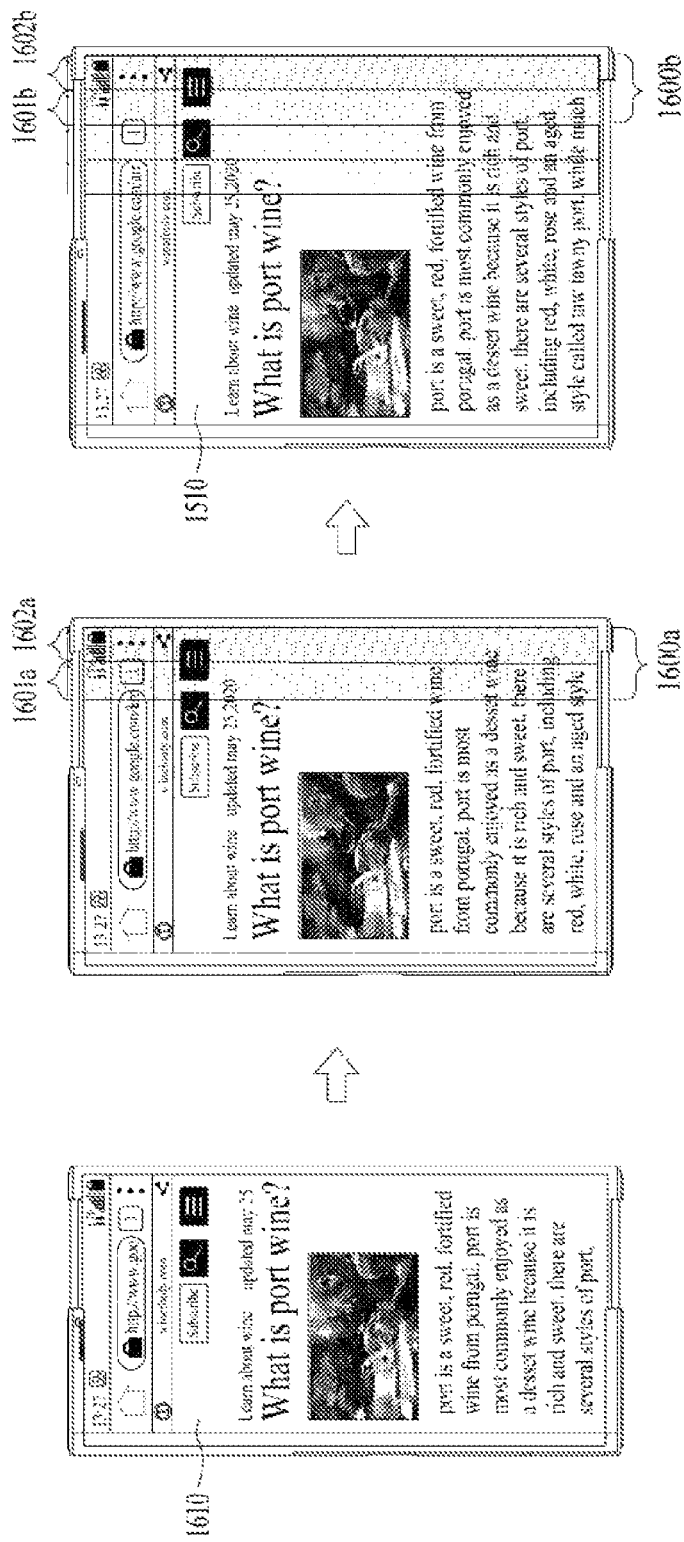
FIG. 16 is a diagram illustrating an embodiment of gradually controlling an output or touch function when a display is extended or contracted in a mobile terminal according to an embodiment of the present disclosure.

FIG. 16 is a diagram illustrating an embodiment of gradually controlling an output or touch function when a display is extended or contracted in a mobile terminal according to an embodiment of the present disclosure.

In an embodiment of the present disclosure, the mobile terminal may gradually control the output function and the touch function when extending or contracting the display.

Referring to the first drawing of FIG. 16, the mobile terminal may receive a control signal for switching to the enlarged display mode while content 1610 is being output in the display in the reduced display mode.

Referring to the second drawing of FIG. 16, the mobile terminal may extend the display by a first region 1600a upon receiving the control signal. In this case, the mobile terminal may gradually subdivide the first region 1600a in order to gradually extend the display and sequentially activate the output function and the touch function.

For example, the mobile terminal may subdivide the first region 1600a into a second region 1601a and a third region 1602a.

Thus, when the mobile terminal extends the display by the first region 1600a, the touch function of the second region 1601a may be activated after activating the output function of the second region 1601a, and the touch function of the third region 1602a may be activated after the output function of the third region 1602a is activated.

Referring to the third drawing of FIG. 16, the mobile terminal may extend the display by a fourth region 1600b upon receiving the control signal. In this case, the mobile terminal may subdivide the fourth region 1600b into a fifth region 1601b and a sixth region 1602b.

Thus, when the mobile terminal extends the display by the fourth region 1600b, the touch function of the fifth region 1601b may be activated after activating the output function of the fifth region 1601b, and the touch function of the sixth region 1602b may be activated after activating the output function of the sixth region 1602b.

When the mobile terminal extends the display, an extended display region may be subdivided to sequentially activate the output function and the touch function in a more precise manner.

In addition, although not illustrated in the drawings, when the mobile terminal contracts the display, it is apparent that a contracted display region may be subdivided to sequentially deactivate the touch function and the output function in a more precise manner.

Figure 17:
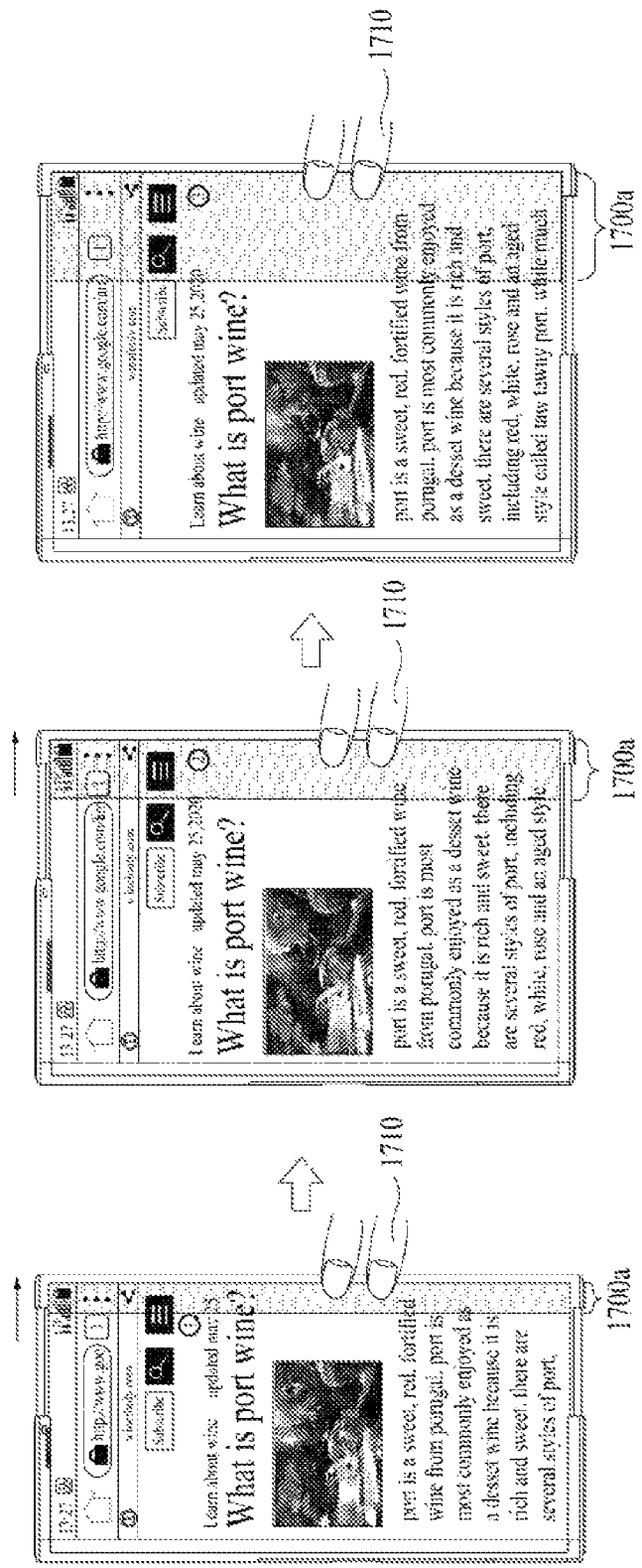
FIG. 17 is a diagram illustrating another embodiment of extending a display in a mobile terminal according to an embodiment of the present disclosure.

FIG. 17 is a diagram illustrating another embodiment of extending a display in a mobile terminal according to an embodiment of the present disclosure.

When the mobile terminal receives a control signal for switching to the enlarged display mode, if a touch input signal is detected in a first region 1700a, the mobile terminal may control the display not to activate the touch function of the first region 1700a until the display is fully extended.

More specifically, referring to the first drawing of FIG. 17, upon receiving a control signal for switching from the reduced display mode to the enlarged display mode, the mobile terminal may sense a touch input 1710 of the user in a region to which the display is extended.

For example, the user may input the control signal for switching to the enlarged display mode while holding the side face of the mobile terminal in the hand.

In this case, the mobile terminal may control the display not to activate the touch function of the first region 1700a until the first region 1700a, which is the extended region of the display, is fully extended.

The mobile terminal may also control the display not to activate the touch function of the first region 1700a until the first region 1700a, which is the extended region of the display, is extended by a predetermined region. Here, the preset region may be determined based on content which is being currently executed. In addition, the preset region may be determined based on new content which is executed in the enlarged display mode.

Referring to the second drawing of FIG. 17, upon sensing the touch input 1710 of the user in the first region 1700a to which the display is extended in a process of switching to the enlarged display mode, the mobile terminal may control the display not to activate the touch function of the first region 1700a until the first region 1700a is fully extended.

Then, if the user is touching the side face of the display while the mobile terminal switches to the enlarged display mode, since the mobile terminal may ignore the touch input of the user, the probability of malfunction of the touch input may be lowered.

That is, unlike the above-described embodiments, in the embodiment of FIG. 17, the mobile terminal gradually activates the output function as the display is extended and does not active the touch function until the display is fully extended, rather than activating the touch function. In addition, while the first region 1700a is extended, the mobile terminal may activate the output function for the first region 1700a.

Referring to the third drawing of FIG. 17, when the mobile terminal has switched to the enlarged display mode, the mobile terminal may activate the touch function of the first region 1700a which has been extended. That is, after the display is fully extended, the mobile terminal may determine the touch input 1710 of the user input to the first region 1700a as a valid touch input.

While the drawings have been separately described for convenience of description, it is also possible to design new embodiments to be implemented by integrating the embodiments described in respective drawings.

Figure 18:
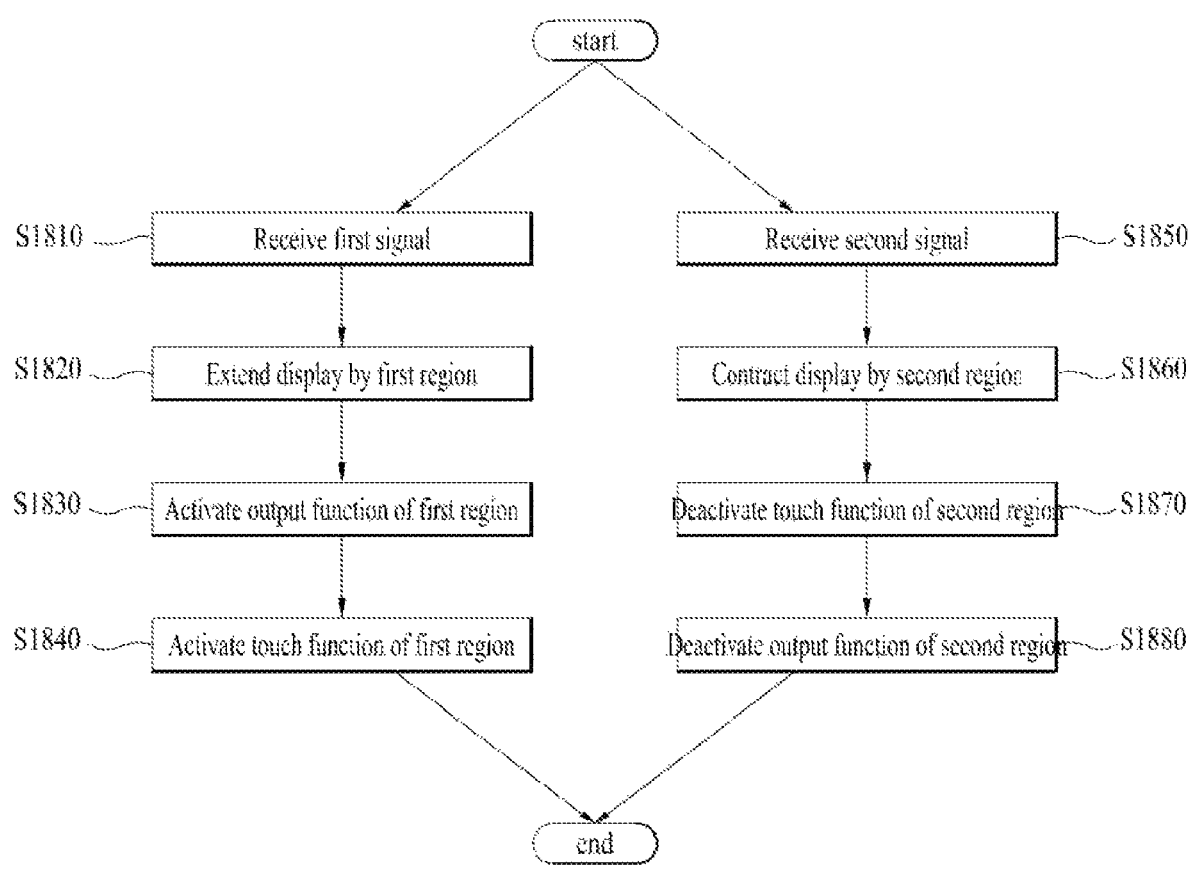
FIG. 18 is a flowchart illustrating an embodiment of controlling an output function or a touch function when a display is extended or contracted in a mobile terminal according to an embodiment of the present disclosure.

FIG. 18 is a flowchart illustrating an embodiment of controlling an output function or a touch function when a display is extended or contracted in a mobile terminal according to an embodiment of the present disclosure. Each step of FIG. 18 described below may be controlled by the controller of FIG. 1.

The mobile terminal performing the control method of FIG. 18 includes a display coupled to a body so that a display region viewed from the front of the body is variable while the display switches between the enlarged display mode and the reduced display mode.

In step S1810, the mobile terminal may receive a first signal. The first signal may correspond to a signal for causing the mobile terminal to switch from the reduced display mode to the enlarged display mode. For example, the user may select a display mode switching button which is physically provided in the mobile terminal or is output on the display.

In step S1820, the mobile terminal may extend the display by a first region upon receiving the first signal. The first region may be a region for maximally extending the display in the enlarged display mode. The first region may be determined based on content executed in the enlarged display mode.

In step S1830, the mobile terminal may activate the output function of the first region. The mobile terminal may output content in the first region while the first region is extended. In this case, even if the output content is not fully output, the mobile terminal may output the content seamlessly.

In step S1840, the mobile terminal may activate the touch function of the first region. When the display is extended by the first region, the mobile terminal may control the display to activate the output function of the first region and then activate the touch function of the first region.

In step S1830, the mobile terminal may keep the touch function in a deactivated state. That is, the mobile terminal may determine that a user touch input which is input to the first region is invalid until step S1840 is executed.

Therefore, the mobile terminal may ignore the user touch input which is input to the first region. After step S1830 is performed, the mobile terminal may activate the touch function of the first region in step S1840.

Unlike steps S1810 to S1840, steps S1850 to S1880 describe the case in which a second signal is received.

In step S1850, the mobile terminal may receive the second signal. Here, the second signal may correspond to a signal for causing the mobile terminal switches from the enlarged display mode to the reduced display mode. For example, while the user uses the mobile terminal in the enlarged display mode, the user may execute an application that is available only in the reduced display mode.

In step S1860, when receiving the second signal, the mobile terminal may contract the display by a second region. In this case, the second region may be a region for minimally contracting the display in the reduced display mode. The second region may be determined based on content executed in the contracted display mode.

In step S1870, the mobile terminal may deactivate the touch function of the second region. The mobile terminal may deactivate the touch function of the second region while the second region is contracted. In this case, the mobile terminal may determine that a user touch input which is input to the second region while the reduced display mode is executed is invalid.

In step S1880, the mobile terminal may deactivate the output function of the second region. When the display is contracted by the second region, the mobile terminal may control the display to deactivate the touch function of the second region and then deactivate the output function of the second region. Accordingly, while ignoring the user touch input which is input to the second region, the mobile terminal may output content which has been output in the second region.

The embodiments described above with reference to FIGS. 10 to 17 may be performed as the control method of the mobile terminal as illustrated in FIG. 18.

Effects of the mobile terminal according to the present disclosure and the control method therefor are as follows.

According to at least one of the embodiments of the present disclosure, when the display is extended, the touch function of an extended region is activated after the output function of the extended region is activate, so that the probability of touch malfunction is lowered According to at least one of the embodiments of the present disclosure, when the display is contracted, the output function of a contracted region is deactivated after deactivating the touch function of the contracted region, so that the probability of touch malfunction is lowered.

The above-described present disclosure may be implemented as computer-readable code on a computer-readable medium in which a program is recorded. The computer-readable medium may be any type of recording device in which data that may be read by a computer system is stored. Examples of the computer-readable medium include a hard disk drive (HDD), a solid state drive (SSD), a silicon disk drive (SDD), a read only memory (ROM), a random access memory (RAM), a compact disk (CD)-ROM, a magnetic tape, a floppy disk, an optical data storage, and a carrier wave (e.g., data transmission over the Internet). The computer may include the controller 180 of the terminal. It will be apparent to those skilled in the art that various modifications and variations may be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

The present disclosure is industrially applicable to a mobile terminal and is repeatedly applicable.

What is claimed is:

1. A mobile terminal comprising:
   a body;
   an input unit configured to receive a user input;
   a display coupled to the body to vary a display region viewable from a front of the body according to a switching between an enlarged display mode and a reduced display mode; and
   a controller,
   wherein the controller is configured to:
   move a display portion positioned at a side of the body to the front of the body and move a display portion positioned at a rear of the body to the front of the body via a side of the body when the display is switched to the enlarged display mode;
   control the display to output a first application;
   control the display to be extended by a first region upon receiving a first signal;
   control the display to activate a touch function of the first region after activating an output function of the first region, based on the extension of the display by the first region; and
   control the display to output first content in the extended first region.

2. The mobile terminal of claim 1, wherein the controller is further configured to:
   control the display to be contracted by a second region upon receiving a second signal; and
   control the display to deactivate an output function of the second region after deactivating a touch function of the second region, based on the contraction of the display by the second region.

3. The mobile terminal of claim 2, wherein the controller is further configured to:
   control the display to be further extended by a third region upon receiving a third signal for further extending the display after the display is extended by the first region; and
   control the display to activate a touch function of the third region after activating an output function of the third region, based on the further extension of the display by the third region.

4. The mobile terminal of claim 3, wherein the controller is further configured to:
   control the display to be further contracted by a fourth region upon receiving a fourth signal for further contracting the display after the display is contracted by the second region; and
   control the display to deactivate an output function of the fourth region after deactivating a touch function of the fourth region, based on the further contraction of the display by the fourth region.

5. The mobile terminal of claim 2, wherein:
   the second signal corresponds to receiving an event; and
   the controller is further configured to control the display to output a widget corresponding to receiving the event.

6. The mobile terminal of claim 5, wherein the controller is further configured to determine whether the display is to be contracted based on the event.

7. The mobile terminal of claim 5, wherein the controller is further configured to control the display to be contracted in response to receiving the event when the mobile terminal receives the event in the enlarged display mode.

8. The mobile terminal of claim 5, wherein the controller is further configured to:
   control the first application to be ended in response to receiving the event; and
   control the display to output a second application corresponding to the event.

9. The mobile terminal of claim 8, wherein the controller is further configured to control the first application to be remained in a background.

10. A method of controlling a mobile terminal, the mobile terminal including a display coupled to a body to vary a display region viewable from a front of the body according to a switching between an enlarged display mode and a reduced display mode, the method comprising:
    moving a display portion positioned at a side of the body to the front of the body and moving a display portion positioned at a rear of the body to the front of the body via a side of the body when the display is switched to the enlarged display mode;
    controlling the display to output a first application;
    controlling the display to be extended by a first region upon receiving a first signal;
    controlling the display to activate a touch function of the first region after activating an output function of the first region, based on the extension of the display by the first region; and
    controlling the display to output first content in the extended first region.

* * * * *